US012682254B2

(12) United States Patent
Inaba et al.

(10) Patent No.: US 12,682,254 B2
(45) Date of Patent: Jul. 14, 2026

(54) SEARCH DEVICE, OPERATION METHOD OF SEARCH DEVICE, OPERATION PROGRAM OF SEARCH DEVICE, AND FLOW REACTION EQUIPMENT

(71) Applicant: FUJIFILM Corporation, Tokyo (JP)

(72) Inventors: Tatsuya Inaba, Minamiashigara (JP); Masataka Hasegawa, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 1157 days.

(21) Appl. No.: 17/694,984

(22) Filed: Mar. 15, 2022

(65) Prior Publication Data

US 2022/0198284 A1     Jun. 23, 2022

Related U.S. Application Data

(63) Continuation of application No. PCT/JP2020/033908, filed on Sep. 8, 2020.

(30) Foreign Application Priority Data

Sep. 30, 2019     (JP) ................................. 2019-178294

(51) Int. Cl.
*G06N 5/01*          (2023.01)
*G06N 5/022*          (2023.01)
*G06N 5/04*          (2023.01)

(52) U.S. Cl.
CPC ............... *G06N 5/01* (2023.01); *G06N 5/022* (2013.01); *G06N 5/04* (2013.01)

(58) Field of Classification Search
None
See application file for complete search history.

(56) References Cited

U.S. PATENT DOCUMENTS

2005/0267607 A1    12/2005  Paik
2019/0064751 A1     2/2019  Ohmori et al.

FOREIGN PATENT DOCUMENTS

CN          105095616 A      11/2015
JP          2002126721 A   *  5/2002
JP          2019040984 A   *  3/2019   ........... G05B 13/026

OTHER PUBLICATIONS

Rodemerck U. Application of a genetic algorithm and a neural network for the discovery and optimization of new solid catalytic materials. Applied Surface Science, vol. 223, Issues 1-3, pp. 168-174, Feb. 15, 2004. Retrieved from<https://www.sciencedirect.com/science/article/pii/S016943320300919X> (Year: 2004).*

(Continued)

*Primary Examiner* — Mariela Reyes
(74) *Attorney, Agent, or Firm* — Studebaker Brackett PLLC

(57)          ABSTRACT

A prediction-data-set-generation-unit generates a prediction-data-set composed of a plurality of prediction-data where an explanatory-variable for an unknown-value of a response-variable and a prediction-value of the response-variable are associated with each other by using a known-data-set. A first-actual-measurement-value-acquisition-unit acquires an actual-measurement-value of the response-variable included in the prediction-data where the prediction-value is closest to a target-value. An improvement-rate-calculation-unit calculates an improvement-rate representing a difference between a known-value of the response-variable closest to the target-value and the actual-measurement-value. A known-data-set-update-unit adds the actual-measurement-value and a value of the explanatory-variable corresponding to the actual-measurement-value to the known-data-set in a case where the improvement-rate is equal to or higher than a target improvement-rate. A second-actual-measurement-value-acquisition-unit acquires an (Continued)

actual-measurement-value of the response-variable for a value of the explanatory-variable included in the prediction-data, which is not used for acquiring the actual-measurement-value by the first-actual-measurement-value-acquisition-unit, in a case where the improvement-rate is lower than the target improvement-rate.

9 Claims, 25 Drawing Sheets

(56) References Cited

OTHER PUBLICATIONS

Cortes-Borda, D. An Autonomous Self-Optimizing Flow Reactor for the Synthesis of Natural Product Carpanone. The Journal of Organic Chemistry, vol. 83, Issue 23, pp. 14286-14299, Sep. 13, 2018. Retrieved from <https://pubs.acs.org/doi/10.1021/acs.joc.8b01821> (Year: 2018).*

International Search Report issued in PCT/JP2020/033908; mailed Dec. 1, 2020.

International Preliminary Report on Patentability and Written Opinion issued in PCT/JP2020/033908; issued Apr. 5, 2022.

An Office Action; mailed by the China National Intellectual Property Administration of the People's Republic of China on Dec. 20, 2024, which corresponds to Chinese Patent Application No. 202080066339.5 and is related to U.S. Appl. No. 17/694,984.

Cortés-Borda Daniel et al., "An Autonomous Self-Optimizing Flow Reactor for the Synthesis of Natural Product Carpanone", The Journal of Organic Chemistry, vol. 83, No. 23, Sep. 13, 2018, pp. 14286-14299, American Chemical Society.

Houben Claudia et al., "Closed-Loop Multitarget Optimization for Discovery of New Emulsion Polymerization Recipes", Organic Process Research & Development, vol. 19, No. 8, Jul. 30, 2015, pp. 1049-1053, American Chemical Society.

The extended European search report issued by the European Patent Office on Nov. 3, 2022, which corresponds to European Patent Application No. 20872554.9-1203 and is related to U.S. Appl. No. 17/694,984.

An Office Action; "Notice of Reasons for Refusal," mailed by the Japanese Patent Office on Jan. 10, 2023, which corresponds to Japanese Patent Application No. 2021-550515 and is related to U.S. Appl. No. 17/694,984; with English language translation.

Communication pursuant to Article 94(3) EPC issued by the European Patent Office on Apr. 24, 2024, which corresponds to European Patent Application No. 20 872 554.9-1203 and is related to U.S. Appl. No. 17/694,984.

* cited by examiner

NDS1 · NDSa

| KNOWN DATA No. | REACTION CONDITION | | | | | | | | REACTION RESULT |
|---|---|---|---|---|---|---|---|---|---|
| | FIRST RAW MATERIAL | | SECOND RAW MATERIAL | | MERGING PORTION | REACTION PORTION | | | PRODUCT |
| | CONCENTRATION (mol/l) | FLOW SPEED (ml/min) | CONCENTRATION (mol/l) | FLOW SPEED (ml/min) | SHAPE | REACTION PATH DIAMETER (mm) | REACTION PATH LENGTH (mm) | REACTION TEMPERATURE (°C) | DISPERSION (ACTUAL MEASUREMENT VALUE) |
| 1 | 0.018 | 10 | 0.018 | 5.5 | T-SHAPE | 1 | 8 | 0 | 1.26 |
| 2 | 0.018 | 20 | 0.018 | 11 | T-SHAPE | 1 | 8 | 40 | 1.23 |
| 3 | 0.018 | 100 | 0.018 | 55 | T-SHAPE | 10 | 8 | 30 | 1.25 |
| 4 | 0.018 | 11 | 0.018 | 5.6 | T-SHAPE | 5 | 8 | 20 | 1.20 ← DK |
| 5 | 0.018 | 20 | 0.018 | 11 | T-SHAPE | 5 | 8 | 10 | 1.28 |
| 6 | 0.018 | 20 | 0.018 | 11 | T-SHAPE | 1 | 8 | 10 | 1.30 |
| 7 | 0.018 | 20 | 0.018 | 20 | CROSS SHAPE | 2 | 8 | 0 | 1.21 |
| 8 | 0.018 | 20 | 0.018 | 20 | T-SHAPE | 2 | 8 | 0 | 1.33 |
| 9 | 0.018 | 20 | 0.018 | 20 | T-SHAPE | 4 | 8 | 0 | 1.21 |
| 10 | 0.018 | 1 | 0.018 | 0.6 | T-SHAPE | 1 | 8 | 0 | 1.32 |

FIG. 9

| | REACTION CONDITION | | | | | | | | | REACTION RESULT |
| PDS1 | FIRST RAW MATERIAL | | SECOND RAW MATERIAL | | MERGING PORTION | REACTION PORTION | | | PRODUCT |
| PREDICTION DATA No. | CONCENTRATION (mol/l) | FLOW SPEED (ml/min) | CONCENTRATION (mol/l) | FLOW SPEED (ml/min) | SHAPE | REACTION PATH DIAMETER (mm) | REACTION PATH LENGTH (mm) | REACTION TEMPERATURE (°C) | DISPERSION (PREDICTION VALUE) |
|---|---|---|---|---|---|---|---|---|---|
| 1 | 0.018 | 40 | 0.018 | 5.5 | T-SHAPE | 7 | 8 | 20 | 1.12 |
| 2 | 0.018 | 40 | 0.018 | 5.6 | T-SHAPE | 8 | 8 | 22 | 1.14 |
| 3 | 0.018 | 35 | 0.018 | 5.5 | T-SHAPE | 5 | 8 | 27 | 1.13 |
| 4 | 0.018 | 35 | 0.018 | 5.6 | T-SHAPE | 5 | 8 | 28 | 1.17 |
| 5 | 0.018 | 30 | 0.018 | 5.5 | T-SHAPE | 4 | 8 | 32 | 1.13 |
| 6 | 0.018 | 30 | 0.018 | 5.6 | T-SHAPE | 4 | 8 | 35 | 1.14 |
| 7 | 0.018 | 40 | 0.018 | 5.5 | T-SHAPE | 2 | 8 | 22 | 1.13 |
| 8 | 0.018 | 40 | 0.018 | 5.6 | T-SHAPE | 2 | 8 | 23 | 1.14 |

PDS

NDS2 / NDSb

| KNOWN DATA No. | REACTION CONDITION | | | | | | | | REACTION RESULT |
| | FIRST RAW MATERIAL | | SECOND RAW MATERIAL | | MERGING PORTION | REACTION PORTION | | | PRODUCT |
| | CONCENTRATION (mol/l) | FLOW SPEED (ml/min) | CONCENTRATION (mol/l) | FLOW SPEED (ml/min) | SHAPE | REACTION PATH DIAMETER (mm) | REACTION PATH LENGTH (mm) | REACTION TEMPERATURE (°C) | DISPERSION (ACTUAL MEASUREMENT VALUE) |
|---|---|---|---|---|---|---|---|---|---|
| 1 | 0.018 | 10 | 0.018 | 5.5 | T-SHAPE | 1 | 8 | 0 | 1.26 |
| 2 | 0.018 | 20 | 0.018 | 11 | T-SHAPE | 1 | 8 | 40 | 1.23 |
| 3 | 0.018 | 100 | 0.018 | 55 | T-SHAPE | 10 | 8 | 30 | 1.25 |
| 4 | 0.018 | 11 | 0.018 | 5.6 | T-SHAPE | 5 | 8 | 20 | 1.20 |
| 5 | 0.018 | 20 | 0.018 | 11 | T-SHAPE | 5 | 8 | 10 | 1.28 |
| 6 | 0.018 | 20 | 0.018 | 11 | T-SHAPE | 1 | 8 | 10 | 1.30 |
| 7 | 0.018 | 20 | 0.018 | 20 | CROSS SHAPE | 2 | 8 | 0 | 1.21 |
| 8 | 0.018 | 20 | 0.018 | 20 | T-SHAPE | 2 | 8 | 0 | 1.33 |
| 9 | 0.018 | 20 | 0.018 | 20 | T-SHAPE | 4 | 8 | 0 | 1.21 |
| 10 | 0.018 | 1 | 0.018 | 0.6 | T-SHAPE | 1 | 8 | 0 | 1.32 |
| 11 | 0.018 | 40 | 0.018 | 5.5 | T-SHAPE | 7 | 8 | 20 | 1.16 |

ADD

PDS

| PDS2 | REACTION CONDITION | | | | | | | | REACTION RESULT |
| | FIRST RAW MATERIAL | | SECOND RAW MATERIAL | | MERGING PORTION | REACTION PORTION | | | PRODUCT |
| PREDICTION DATA No. | CONCENTRATION (mol/l) | FLOW SPEED (ml/min) | CONCENTRATION (mol/l) | FLOW SPEED (ml/min) | SHAPE | REACTION PATH DIAMETER (mm) | REACTION PATH LENGTH (mm) | REACTION TEMPERATURE (°C) | DISPERSION (PREDICTION VALUE) |
|---|---|---|---|---|---|---|---|---|---|
| 1 | 0.018 | 40 | 0.018 | 5.5 | T-SHAPE | 7 | 8 | 20 | 1.07 |
| 2 | 0.018 | 40 | 0.018 | 5.6 | T-SHAPE | 6 | 8 | 22 | 1.08 |
| 3 | 0.018 | 38 | 0.018 | 5.5 | T-SHAPE | 7 | 8 | 21 | 1.06 |
| 4 | 0.018 | 38 | 0.018 | 5.6 | T-SHAPE | 7 | 8 | 23 | 1.05 |
| 5 | 0.018 | 35 | 0.018 | 5.5 | T-SHAPE | 7 | 8 | 24 | 1.07 |
| 6 | 0.018 | 35 | 0.018 | 5.6 | T-SHAPE | 6 | 8 | 25 | 1.08 |

NDS3 / NDSb

| KNOWN DATA No. | REACTION CONDITION | | | | | | | | REACTION RESULT |
|---|---|---|---|---|---|---|---|---|---|
| | FIRST RAW MATERIAL | | SECOND RAW MATERIAL | | MERGING PORTION | REACTION PORTION | | | PRODUCT |
| | CONCENTRATION (mol/l) | FLOW SPEED (ml/min) | CONCENTRATION (mol/l) | FLOW SPEED (ml/min) | SHAPE | REACTION PATH DIAMETER (mm) | REACTION PATH LENGTH (mm) | REACTION TEMPERATURE (°C) | DISPERSION (ACTUAL MEASUREMENT VALUE) |
| 1 | 0.018 | 10 | 0.018 | 5.5 | T-SHAPE | 1 | 8 | 0 | 1.26 |
| 2 | 0.018 | 20 | 0.018 | 11 | T-SHAPE | 1 | 8 | 40 | 1.23 |
| 3 | 0.018 | 100 | 0.018 | 55 | T-SHAPE | 10 | 8 | 30 | 1.25 |
| 4 | 0.018 | 11 | 0.018 | 5.6 | T-SHAPE | 5 | 8 | 20 | 1.20 |
| 5 | 0.018 | 20 | 0.018 | 11 | T-SHAPE | 5 | 8 | 10 | 1.28 |
| 6 | 0.018 | 20 | 0.018 | 11 | T-SHAPE | 1 | 8 | 10 | 1.30 |
| 7 | 0.018 | 20 | 0.018 | 20 | CROSS SHAPE | 2 | 8 | 0 | 1.21 |
| 8 | 0.018 | 20 | 0.018 | 20 | T-SHAPE | 2 | 8 | 0 | 1.33 |
| 9 | 0.018 | 20 | 0.018 | 20 | T-SHAPE | 4 | 8 | 0 | 1.21 |
| 10 | 0.018 | 1 | 0.018 | 0.6 | T-SHAPE | 1 | 8 | 0 | 1.32 |
| 11 | 0.018 | 40 | 0.018 | 5.5 | T-SHAPE | 7 | 8 | 20 | 1.16 |
| 12 | 0.018 | 38 | 0.018 | 5.6 | T-SHAPE | 7 | 8 | 23 | 1.09 |

ADD, DK, DE, EV

FIG. 15

PDS

PDS3

| PREDICTION DATA No. | REACTION CONDITION | | | | | | | | REACTION RESULT |
| | FIRST RAW MATERIAL | | SECOND RAW MATERIAL | | MERGING PORTION | REACTION PORTION | | | PRODUCT |
| | CONCENTRATION (mol/l) | FLOW SPEED (ml/min) | CONCENTRATION (mol/l) | FLOW SPEED (ml/min) | SHAPE | REACTION PATH DIAMETER (mm) | REACTION PATH LENGTH (mm) | REACTION TEMPERATURE (°C) | DISPERSION (PREDICTION VALUE) |
|---|---|---|---|---|---|---|---|---|---|
| 1 | 0.018 | 36 | 0.018 | 5.5 | T-SHAPE | 6.2 | 8 | 20 | 1.05 |
| 2 | 0.018 | 36 | 0.018 | 5.6 | T-SHAPE | 6.6 | 8 | 22 | 1.06 |
| 3 | 0.018 | 37 | 0.018 | 5.5 | T-SHAPE | 7 | 8 | 21 | 1.07 |
| 4 | 0.018 | 37 | 0.018 | 5.6 | T-SHAPE | 6 | 8 | 21 | 1.04 |

NDS4 — NDSb

| KNOWN DATA No. | REACTION CONDITION | | | | | | | | | REACTION RESULT |
|---|---|---|---|---|---|---|---|---|---|---|
| | FIRST RAW MATERIAL | | SECOND RAW MATERIAL | | MERGING PORTION | REACTION PORTION | | | | PRODUCT |
| | CONCENTRATION (mol/l) | FLOW SPEED (ml/min) | CONCENTRATION (mol/l) | FLOW SPEED (ml/min) | SHAPE | REACTION PATH DIAMETER (mm) | REACTION PATH LENGTH (mm) | REACTION TEMPERATURE (°C) | | DISPERSION (ACTUAL MEASUREMENT VALUE) |
| 1 | 0.018 | 10 | 0.018 | 5.5 | T-SHAPE | 1 | 8 | 0 | | 1.26 |
| 2 | 0.018 | 20 | 0.018 | 11 | T-SHAPE | 1 | 8 | 40 | | 1.23 |
| 3 | 0.018 | 100 | 0.018 | 55 | T-SHAPE | 10 | 8 | 30 | | 1.25 |
| 4 | 0.018 | 11 | 0.018 | 5.6 | T-SHAPE | 5 | 8 | 20 | | 1.20 |
| 5 | 0.018 | 20 | 0.018 | 11 | T-SHAPE | 5 | 8 | 10 | | 1.28 |
| 6 | 0.018 | 20 | 0.018 | 11 | T-SHAPE | 1 | 8 | 10 | | 1.30 |
| 7 | 0.018 | 20 | 0.018 | 20 | CROSS SHAPE | 2 | 8 | 0 | | 1.21 |
| 8 | 0.018 | 20 | 0.018 | 20 | T-SHAPE | 2 | 8 | 0 | | 1.33 |
| 9 | 0.018 | 20 | 0.018 | 20 | T-SHAPE | 4 | 8 | 0 | | 1.21 |
| 10 | 0.018 | 1 | 0.018 | 0.6 | T-SHAPE | 1 | 8 | 0 | | 1.32 |
| 11 | 0.018 | 40 | 0.018 | 5.5 | T-SHAPE | 7 | 8 | 20 | | 1.16 |
| 12 | 0.018 | 38 | 0.018 | 5.6 | T-SHAPE | 7 | 8 | 23 | | 1.09 |
| 13 | 0.018 | 36 | 0.018 | 5.6 | T-SHAPE | 6.6 | 8 | 22 | | 1.05 |

ADD    DE    EV    DK

FIG. 19

PDS

| PDS4 | REACTION CONDITION | | | | | | | | REACTION RESULT |
|---|---|---|---|---|---|---|---|---|---|
| | FIRST RAW MATERIAL | | SECOND RAW MATERIAL | | MERGING PORTION | REACTION PORTION | | | PRODUCT |
| PREDICTION DATA No. | CONCENTRATION (mol/l) | FLOW SPEED (ml/min) | CONCENTRATION (mol/l) | FLOW SPEED (ml/min) | SHAPE | REACTION PATH DIAMETER (mm) | REACTION PATH LENGTH (mm) | REACTION TEMPERATURE (°C) | DISPERSION (PREDICTION VALUE) |
| 1 | 0.018 | 39 | 0.018 | 5.5 | T-SHAPE | 6.7 | 8 | 20 | 1.05 |
| 2 | 0.018 | 39 | 0.018 | 5.6 | T-SHAPE | 6.6 | 8 | 19 | 1.06 |
| 3 | 0.018 | 39 | 0.018 | 5.5 | T-SHAPE | 6.8 | 8 | 18 | 1.04 |
| 4 | 0.018 | 39 | 0.018 | 5.6 | T-SHAPE | 6.9 | 8 | 17 | 1.05 |

NDS5 / NDSb

| KNOWN DATA No. | REACTION CONDITION | | | | | | | | REACTION RESULT |
| | FIRST RAW MATERIAL | | SECOND RAW MATERIAL | | MERGING PORTION | REACTION PORTION | | | PRODUCT |
| | CONCENTRATION (mol/l) | FLOW SPEED (ml/min) | CONCENTRATION (mol/l) | FLOW SPEED (ml/min) | SHAPE | REACTION PATH DIAMETER (mm) | REACTION PATH LENGTH (mm) | REACTION TEMPERATURE (°C) | DISPERSION (ACTUAL MEASUREMENT VALUE) |
|---|---|---|---|---|---|---|---|---|---|
| 1 | 0.018 | 10 | 0.018 | 5.5 | T-SHAPE | 1 | 8 | 0 | 1.26 |
| 2 | 0.018 | 20 | 0.018 | 11 | T-SHAPE | 1 | 8 | 40 | 1.23 |
| 3 | 0.018 | 100 | 0.018 | 55 | T-SHAPE | 10 | 8 | 30 | 1.25 |
| 4 | 0.018 | 11 | 0.018 | 5.6 | T-SHAPE | 5 | 8 | 20 | 1.20 |
| 5 | 0.018 | 20 | 0.018 | 11 | T-SHAPE | 5 | 8 | 10 | 1.28 |
| 6 | 0.018 | 20 | 0.018 | 11 | T-SHAPE | 1 | 8 | 10 | 1.30 |
| 7 | 0.018 | 20 | 0.018 | 20 | CROSS SHAPE | 2 | 8 | 0 | 1.21 |
| 8 | 0.018 | 20 | 0.018 | 20 | T-SHAPE | 2 | 8 | 0 | 1.33 |
| 9 | 0.018 | 20 | 0.018 | 20 | T-SHAPE | 4 | 8 | 0 | 1.21 |
| 10 | 0.018 | 1 | 0.018 | 0.6 | T-SHAPE | 1 | 8 | 0 | 1.32 |
| 11 | 0.018 | 40 | 0.018 | 5.5 | T-SHAPE | 7 | 8 | 20 | 1.16 |
| 12 | 0.018 | 38 | 0.018 | 5.6 | T-SHAPE | 7 | 8 | 23 | 1.09 |
| 13 | 0.018 | 37 | 0.018 | 5.6 | T-SHAPE | 6 | 8 | 21 | 1.06 |

ADD

PDS

| PDS5 | REACTION CONDITION | | | | | | | | REACTION RESULT |
|---|---|---|---|---|---|---|---|---|---|
| | FIRST RAW MATERIAL | | SECOND RAW MATERIAL | | MERGING PORTION | REACTION PORTION | | | PRODUCT |
| PREDICTION DATA No. | CONCENTRATION (mol/l) | FLOW SPEED (ml/min) | CONCENTRATION (mol/l) | FLOW SPEED (ml/min) | SHAPE | REACTION PATH DIAMETER (mm) | REACTION PATH LENGTH (mm) | REACTION TEMPERATURE (°C) | DISPERSION (PREDICTION VALUE) |
| 1 | 0.018 | 37 | 0.018 | 5.6 | T-SHAPE | 6.2 | 8 | 20 | 1.04 |
| 2 | 0.018 | 37 | 0.018 | 5.6 | T-SHAPE | 6.3 | 8 | 21 | 1.05 |
| 3 | 0.018 | 37 | 0.018 | 5.6 | T-SHAPE | 6.4 | 8 | 21 | 1.05 |
| 4 | 0.018 | 37 | 0.018 | 5.6 | T-SHAPE | 6.5 | 8 | 20 | 1.05 |

DS → 1.04

EV → 20

SEARCH DEVICE, OPERATION METHOD OF SEARCH DEVICE, OPERATION PROGRAM OF SEARCH DEVICE, AND FLOW REACTION EQUIPMENT

CROSS-REFERENCE TO RELATED APPLICATIONS

This application is a Continuation of PCT International Application No. PCT/JP2020/033908 filed on Sep. 8, 2020, which claims priority under 35 U.S.C. § 119(a) to Japanese Patent Application No. 2019-178294 filed on Sep. 30, 2019. Each of the above application(s) is hereby expressly incorporated by reference, in its entirety, into the present application.

BACKGROUND OF THE INVENTION

1. Field of the Invention

The technology of the present disclosure relates to a search device, an operation method of a search device, a non-transitory computer readable recording medium storing an operation program of a search device, and flow reaction equipment.

2. Description of the Related Art

In a device that synthesizes and processes a substance, such as a chemical reaction device and a semiconductor processing device, a characteristic value of a product generated varies depending on various processing conditions of the device. In order to obtain the product having an optimum characteristic, it is necessary to search for an input parameter by which a target output result can be obtained, by using a plurality of the processing conditions as the input parameter and the characteristic value of the product as an output parameter. Since it is not realistic to evaluate the output result for all combinations of a plurality of the input parameters, an optimum solution of the input parameter is searched for by using a machine learning method, such as a neural network (for example, see JP2019-40984A).

In JP2019-40984A, it is disclosed that a prediction model showing a relationship between the input parameter and the output parameter is generated by machine learning, and the optimum solution is searched for based on the prediction model. Specifically, in JP2019-40984A, it is proposed that a value of the input parameter, by which the target output result can be obtained, is obtained based on the prediction model as a prediction value, it is determined whether or not an actual measurement value corresponding to the prediction value achieves a target value, and the prediction model is updated by adding the prediction value and the actual measurement value to supervised data in a case in which the actual measurement value does not achieve the target value, so that the search efficiency is improved. Further, in JP2019-40984A, it is proposed that in a case in which the actual measurement value is not close to the target value, a region in which a combination of the prediction value and the actual measurement value, which is not close to the target value is excluded from a search region, so that the accuracy of reaching the optimum solution is improved.

SUMMARY OF THE INVENTION

As described above, in JP2019-40984A, it is proposed that the optimum solution is obtained by searching for a new region in a case in which the actual measurement value is not close to the target value. However, in a search method disclosed in JP2019-40984A, since the search region is simply changed based on a difference between the actual measurement value and the target value, there is a possibility that it takes a long time to reach the optimum solution due to the search for a region in which the difference between the actual measurement value and the target value is only slightly reduced.

The technology of the present disclosure is to provide a search device, an operation method of a search device, a non-transitory computer readable recording medium storing an operation program of a search device, and flow reaction equipment, which can improve a search speed.

In order to achieve the above object, a search device according to the present disclosure comprises a prediction data set generation unit that generates a prediction data set composed of a plurality of prediction data in which an explanatory variable for which a value of a response variable is unknown and a prediction value of the response variable are associated with each other by using a known data set composed of a plurality of known data in which one or more explanatory variables and one or more response variables are associated with each other, a first actual measurement value acquisition unit that acquires an actual measurement value of the response variable for a value of the explanatory variable included in the prediction data in which the prediction value is closest to a target value in the prediction data set, an improvement rate calculation unit that calculates an improvement rate representing a difference between a known value of the response variable closest to the target value and the actual measurement value from the known data set, a known data set update unit that adds the actual measurement value and a value of the explanatory variable corresponding to the actual measurement value to the known data set as the known data in a case in which the improvement rate is equal to or higher than a target improvement rate, and a second actual measurement value acquisition unit that acquires an actual measurement value of the response variable for a value of the explanatory variable included in the prediction data, which is not used for acquiring the actual measurement value by the first actual measurement value acquisition unit, in the prediction data set, the actual measurement value being used for recalculating the improvement rate, in a case in which the improvement rate is lower than the target improvement rate.

It is preferable that the search device further comprise a prediction data set specifying unit that specifies the prediction data set generated by the prediction data set generation unit based on the known data set updated by the known data set update unit immediately after obtaining a highest improvement rate in the past, in a case in which the improvement rate is lower than the target improvement rate, in which the second actual measurement value acquisition unit acquires the actual measurement value of the response variable for the value of the explanatory variable included in the prediction data, which is not used for acquiring the actual measurement value by the first actual measurement value acquisition unit, in the prediction data set specified by the prediction data set specifying unit, the improvement rate calculation unit calculates the improvement rate based on the known data set updated by the known data set update unit, and the actual measurement value acquired by the second actual measurement value acquisition unit, and the known data set update unit adds, as the known data, the actual measurement value acquired by the second actual measurement value acquisition unit, and the value of the explanatory variable corresponding to the actual measurement value to the known data set in a case in which the improvement rate is equal to or higher than the target improvement rate.

It is preferable that the second actual measurement value acquisition unit acquires the actual measurement value based on the prediction data including a value of the explanatory variable deviating from the value of the explanatory variable included in the prediction data used by the first actual measurement value acquisition unit by a value equal to or more than a threshold value, in the prediction data set specified by the prediction data set specifying unit.

It is preferable that the second actual measurement value acquisition unit acquires the actual measurement value by selecting the prediction data in which the prediction value is closest to the target value in a case in which a plurality of the prediction data including the value of the explanatory variable deviating from the value equal to or more than the threshold value are present.

It is preferable that the search device further comprises a target improvement rate change unit that changes the target improvement rate in a case in which the known data set update unit updates the known data set.

It is preferable that the prediction data set generation unit generates a trained model by machine learning indicating a relationship between the explanatory variable and the response variable based on the known data set, and generate the prediction data set by the known data set, the trained model, and a search algorithm.

It is preferable that the search algorithm be a genetic algorithm.

An operation method of a search device according to the present disclosure comprises a prediction data set generation step of generating a prediction data set composed of a plurality of prediction data in which an explanatory variable for which a value of a response variable is unknown and a prediction value of the response variable are associated with each other by using a known data set composed of a plurality of known data in which one or more explanatory variables and one or more response variables are associated with each other, a first actual measurement value acquisition step of acquiring an actual measurement value of the response variable for a value of the explanatory variable included in the prediction data in which the prediction value is closest to a target value in the prediction data set, an improvement rate calculation step of calculating an improvement rate representing a difference between a known value of the response variable closest to the target value and the actual measurement value from the known data set, a known data set update step of adding the actual measurement value and a value of the explanatory variable corresponding to the actual measurement value to the known data set as the known data in a case in which the improvement rate is equal to or higher than a target improvement rate, and a second actual measurement value acquisition step of acquiring an actual measurement value of the response variable for a value of the explanatory variable included in the prediction data, which is not used for acquiring the actual measurement value in the first actual measurement value acquisition step, in the prediction data set, the actual measurement value being used for recalculating the improvement rate, in a case in which the improvement rate is lower than the target improvement rate.

A non-transitory computer readable recording medium storing an operation program of a search device according to the present disclosure causes a computer to operate as a prediction data set generation unit that generates a prediction data set composed of a plurality of prediction data in which an explanatory variable for which a value of a response variable is unknown and a prediction value of the response variable are associated with each other by using a known data set composed of a plurality of known data in which one or more explanatory variables and one or more response variables are associated with each other, a first actual measurement value acquisition unit that acquires an actual measurement value of the response variable for a value of the explanatory variable included in the prediction data in which the prediction value is closest to a target value in the prediction data set, an improvement rate calculation unit that calculates an improvement rate representing a difference between a known value of the response variable closest to the target value and the actual measurement value from the known data set, a known data set update unit that adds the actual measurement value and a value of the explanatory variable corresponding to the actual measurement value to the known data set as the known data in a case in which the improvement rate is equal to or higher than a target improvement rate, and a second actual measurement value acquisition unit that acquires an actual measurement value of the response variable for a value of the explanatory variable included in the prediction data, which is not used for acquiring the actual measurement value by the first actual measurement value acquisition unit, in the prediction data set, the actual measurement value being used for recalculating the improvement rate, in a case in which the improvement rate is lower than the target improvement rate.

Flow reaction equipment according to the present disclosure comprises the search device according to any one of the above descriptions, a reaction section that causes a reaction of a raw material while causing the raw material flow, a recovery section that recovers a product, a system controller that controls the reaction section under a set reaction condition, and a detection unit that detects a reaction result in the reaction section, and outputs the detected reaction result. The system controller operates the search device using the reaction condition as an explanatory variable and the reaction result as a response variable, and sets the value of the explanatory variable corresponding to the actual measurement value in the reaction section as the reaction condition in a case in which the actual measurement value achieves the target value.

According to the technology of the present disclosure, it is possible to provide the search device, the operation method of a search device, the non-transitory computer readable recording medium storing an operation program of a search device, and the flow reaction equipment, which can improve the search speed.

BRIEF DESCRIPTION OF THE DRAWINGS

FIG. 4 is a block diagram showing a functional configuration of a search device.

FIG. 6 is a diagram showing a known data set.

FIG. 9 is a diagram showing a prediction data set generated based on the known data set shown in FIG. 6.

FIG. 11 is a diagram showing an updated known data set obtained by updating the known data set shown in FIG. 6.

FIG. 12 is a schematic diagram showing a process in which the known data set is updated to a new known data set in a case in which the improvement rate is equal to or higher than a target improvement rate.

FIG. 13 is a diagram showing the prediction data set generated based on the known data set shown in FIG. 11.

FIG. 14 is a diagram showing the updated known data set obtained by updating the known data set shown in FIG. 11.

FIG. 15 is a diagram showing the prediction data set generated based on the known data set shown in FIG. 14.

FIG. 18 is a diagram showing the updated known data set obtained by updating the known data set shown in FIG. 14.

FIG. 19 is a diagram showing the prediction data set generated based on the known data set shown in FIG. 18.

FIG. 23 is a diagram showing the updated known data set updated by a method in the related art based on the known data set shown in FIG. 14.

FIG. 24 is a diagram showing the prediction data set generated based on the known data set shown in FIG. 23.

DESCRIPTION OF THE PREFERRED EMBODIMENTS

Embodiment

Hereinafter, flow reaction equipment according to an embodiment of the present disclosure will be described. The flow reaction equipment is equipment that obtains a product by flow reaction processing.

Examples of a method of chemically reacting a raw material containing a reactant a so-called batch processing in which the raw material is reacted in a state of being accommodated in a container, and a continuous type in which the raw material is reacted while causing the raw material flow Since the reaction is performed while causing the raw material flow, the continuous reaction is called a flow reaction. In the flow reaction processing, the reaction is continuously generated, so that the product can be easily obtained with uniform properties. In addition, the flow reaction processing has an advantage that the productivity is higher as compared to the batch processing.

Figure 1:
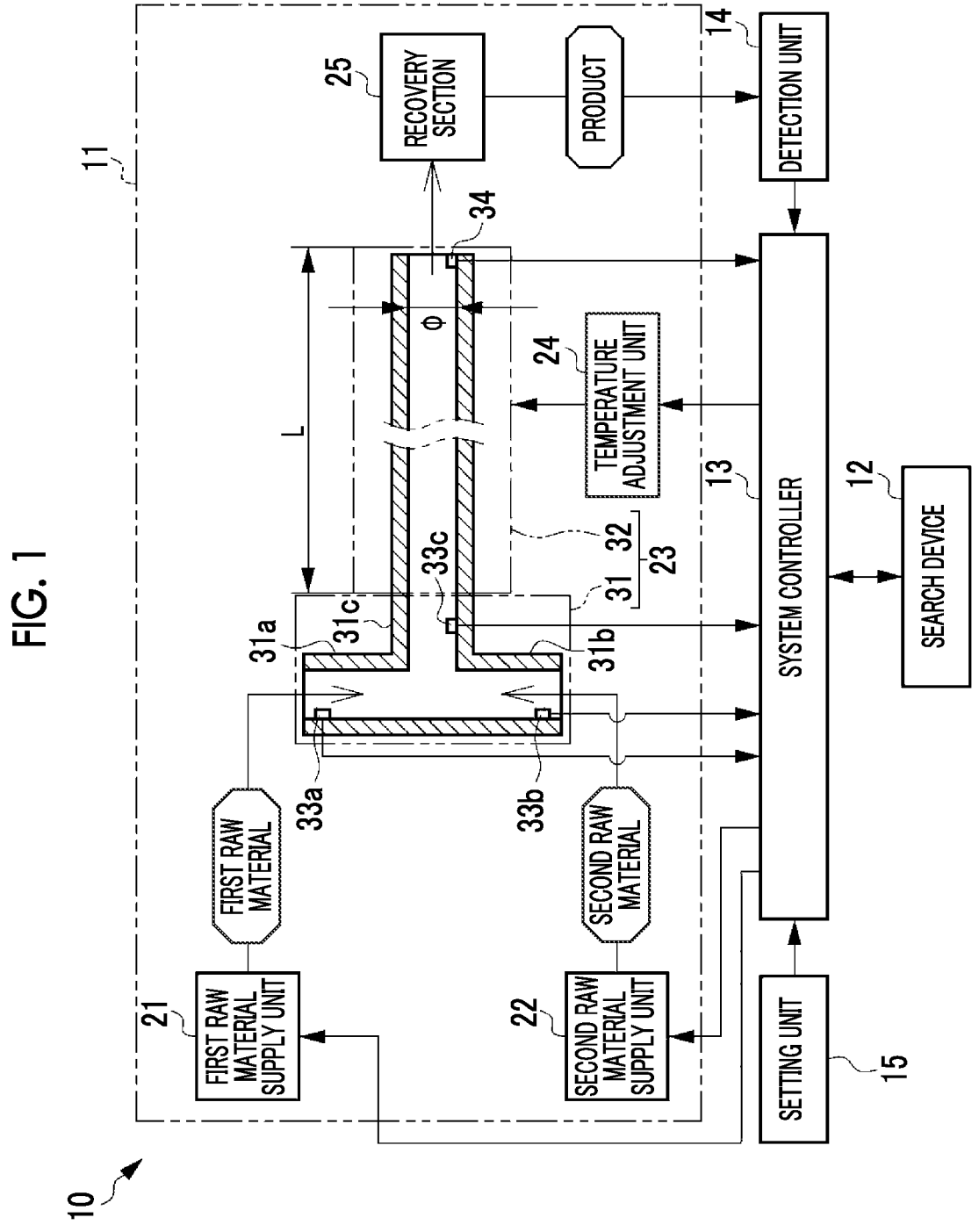
FIG. 1 shows flow reaction equipment including a reaction section having a merging portion having a I-shape.

In FIG. 1, flow reaction equipment 10 comprises a flow reaction device 11, a search device 12, a system controller 13, a detection unit 14, and a setting unit 15.

The flow reaction performed in the flow reaction device 11 may be, for example, an elementary reaction, such as an initiation reaction or a termination reaction, in an anionic polymerization reaction, in addition to a synthesis reaction of synthesizing a compound, which is a monomer, and a polymerization reaction of generating a polymer by causing a reaction of monomers. Therefore, a reactant, which is a target of the flow reaction, may be, for example, a growth stage compound, which is a target of the termination reaction. In the present embodiment, the flow reaction device 11 performs the termination reaction (anionic polymerization reaction) in which the growth of polystyryillithium is terminated by methanol in the flow reaction.

The flow reaction device 11 comprises a first raw material supply unit 21, a second raw material supply unit 22, a reaction section 23, a temperature adjustment unit 24, and a recovery section 25. Each of the first raw material supply unit 21 and the second raw material supply unit 22 are connected to an upstream part end of the reaction section 23 via a pipe (not shown). The recovery section 25 is connected to a downstream end part of the reaction section 23 via a pipe (not shown).

The first raw material supply unit 21 supplies a first raw material to the reaction section 23. The first raw material supply unit 21 includes a pump (not shown), and adjusts a flow rate of the first raw material sent from the first raw material supply unit 21 to the reaction section 23 by adjusting the rotation speed of the pump.

In the present embodiment, the first raw material is a solution in which polystyryllithium is dissolved in a solvent. Polystyryllithium is an example of the reactant, which is the target of the flow reaction. As the solvent, for example, tetrahydrofuran (hereinafter referred to as THF) is used, and toluene and hexane are mixed in a small amount. Note that the first raw material of the flow reaction may be a solution in which a mixture of the reactant and another substance is dissolved in the solvent, or may be a solution in which only the reactant is dissolved in the solvent.

The second raw material supply unit 22 supplies a second raw material to the reaction section 23. As in the first raw material supply unit 21, the second raw material supply unit 22 includes a pump (not shown), and adjusts a flow rate of the second raw material sent from the second raw material supply unit 22 to the reaction section 23 by adjusting the rotation speed of the pump.

In the present embodiment, the second raw material is a mixture of methanol and water, that is, a methanol aqueous solution. Methanol is used as a terminator of the anionic polymerization reaction.

The reaction section 23 is a section for performing the flow reaction (anionic polymerization reaction in the present embodiment). The reaction section 23 includes a merging portion 31 and a reaction portion 32. The merging portion 31 is configured by a first pipe portion 31*a*, a second pipe portion 31*b*, and a third pipe portion 31*c*, which are connected to communicate with each other. The first pipe portion 31*a* and the second pipe portion 31*b* are connected to each other in a straight line. The third pipe portion 31*c* is connected to a connecting part between the first pipe portion 31*a* and the second pipe portion 31*b* to be orthogonal to the first pipe portion 31*a* and the second pipe portion 31*b*. That is, a shape of the merging portion 31 is a T-shape.

One end of the first pipe portion 31*a* is connected to the first raw material supply unit 21. One end of the second pipe portion 31*b* is connected to the second raw material supply unit 22. One end of the third pipe portion 31*c* is connected to the reaction portion 32. The first raw material is supplied to the first pipe portion 31*a* from the first raw material supply unit 21. The second raw material is supplied to the second pipe portion 31*b* from the second raw material supply unit 22. The first raw material supplied to the first pipe portion 31*a* and the second raw material supplied to the second pipe portion 31*b* merge in the third pipe portion 31*c*, and are sent to the reaction portion 32 as the mixture of the first raw material and the second raw material.

The first pipe portion 31*a* is provided with a first flow speed sensor 33*a* that detects a flow speed of the first raw material passing through the first pipe portion 31*a*. In addition, the second pipe portion 31*b* is provided with a second flow speed sensor 33*b* that detects a flow speed of the second raw material passing through the second pipe portion 31*b*. Further, the third pipe portion 31*c* is provided with a third flow speed sensor 33*c* that detects a flow speed of the mixture of the first raw material and the second raw material passing through the third pipe portion 31*c*.

Each of detection signals of the first flow speed sensor 33*a*, the second flow speed sensor 33*b*, and the third flow speed sensor 33*c* is output to the system controller 13.

The reaction portion 32 is an elongated pipe in which a plurality of straight pipes having the same inner diameter are connected in a straight line. A length L of the reaction portion 32 can be changed by changing at least one of the number of straight pipes to be connected or the length of the straight pipes. In addition, an inner diameter Φ of the reaction portion 32 can be changed by changing the inner diameter of the straight pipe to be connected.

The inside of the reaction portion 32 is a flow path through which the mixture of the first raw material and the second raw material flows, and is a place in which the flow reaction is performed. As the mixture passes through the reaction portion 32, the flow reaction proceeds, and a polystyrene solution is generated. Note that although the flow reaction proceeds slightly in the third pipe portion 31*c* of the merging portion 31, a length of the third pipe portion 31*c* with respect to the length L of the reaction portion 32 is very short, so that the reaction in the third pipe portion 31*c* can be ignored, and the length L of the reaction portion 32 can be regarded as a reaction path length, which is the length of the place in which the flow reaction is performed. The inner diameter Φ of the reaction portion 32 is the reaction path diameter, which is the diameter of the place in which the flow reaction is performed.

The temperature adjustment unit 24 includes a heater and a cooler, and adjusts the temperature inside the reaction portion 32 (hereinafter, referred to as a reaction temperature), A temperature sensor 34 that detects the reaction temperature is provided at the downstream end part of the reaction portion 32. A detection signal of the temperature sensor 34 is output to the system controller 13.

The recovery section 25 is a section that recovers polystyrene, which is the product of the flow reaction. The recovery section 25 includes a precipitation unit, a collection unit, a drying unit, a disposal unit, and the like (none of which are shown). The precipitation unit, the collection unit, and the drying unit are connected in series in this order, and function as a first recovery unit that recovers the obtained product. The disposal unit is connected to the reaction portion 32 in parallel with the first recovery unit, and functions as a second recovery unit that recovers an unnecessary disposal object. A switching valve (not shown) is provided at a branch portion between the disposal unit and the precipitation unit. This switching valve sorts the liquid sent from the reaction section 23 into the product and the disposal object, and performs a guide to the first recovery unit or the second recovery unit.

The precipitation unit precipitates polystyrene, which is the product. For example, a container comprising a stirrer can be used as the precipitation unit. Polystyrene can be precipitated by accommodating methanol in the container, stirring methanol, and introducing the polystyrene solution guided from the reaction section 23 into stirred methanol.

The collection unit collects polystyrene precipitated by the precipitation unit from a mixed solution of methanol, THF, and the like. For example, a filter can be used as the collection unit.

The drying unit dries polystyrene collected by the collection unit. For example, a constant-temperature tank having a depressurization function can be used as the drying unit. By performing heating in a state in which the inside of the constant-temperature tank is depressurized, dried polystyrene can be obtained as the product.

The disposal unit is a tank, for example. The disposal unit stores the liquid guided from the reaction section 23 via the switching valve as the disposal object.

The detection unit 14 is included in the recovery section 25 and is connected to the first recovery unit that recovers the product. The detection unit 14 detects the reaction result, which is a processing result of the flow reaction, and outputs the reaction result to the search device 12 via the system controller 13. Examples of a parameter representing the reaction result (hereinafter, referred to as a "result parameter") include a yield, as well as a property of the product, such as a molecular weight dispersion (hereinafter, simply referred to as a dispersion), a purity of the product, and a molecular weight.

In addition, in a case in which the product is obtained in a solution state in which the product is dissolved in the solvent in the recovery section 25, the concentration of the product in the solution (molar concentration or the like) can be used as the result parameter. Note that the detection unit 14 may detect various properties of a by-product, such as a yield and a purity, in addition to the various properties and the yield of the product, as the result parameter. A plurality of types of result parameters may be used, but in the present embodiment, the dispersion is used as the result parameter.

The dispersion is a value obtained by dividing a weight-average molecular weight by a number average molecular weight. The detection unit 14 obtains the dispersion by gel permeation chromatography (hereinafter abbreviated as GPC) by using, for example, the polystyrene solution in which polystyrene as the product is dissolved in tetrahydrofuran.

The GPC performs the measurement, for example, under the following conditions.

Device: FILC-8220GPC (manufactured by TOSOH CORPORATION)

Detector: refractive index (RI) detector

Precolumn: TSKGUARDCOLUMN HXL-L 6 mm×40 mm (manufactured by TOSOH CORPORATION)

Sample-side column: direct connection of the following three items (1) to (3) (all manufactured by TOSOH CORPORATION)

(1) TSK-GEL GMHXL 7.8 mm×300 mm (2) TSK-GEL G4000HXL 7.8 mm×300 mm (3) TSK-GEL G2000HXL 7.8 mm×300 mm

Reference-side column: TSK-GEL G1000HXL 7.8 mm×300 mm

Constant-temperature tank temperature: 40° C.

Movement layer: tetrahydrofuran

Sample-side movement layer flow rate: 1.0 mL/min

Reference-side movement layer flow rate: 1.0 mL/min

Sample concentration: 0.1% by mass

Sample injection amount: 100 µl

Data collection time: 5 minutes to 45 minutes after sample injection

Sampling pitch: 300 msec

The setting unit 15 receives the setting of the reaction conditions related to the production of the product by an operator of the flow reaction device 11, The reaction conditions received by the setting unit 15 are registered in the system controller 13 as condition data. For example, the condition data includes items of the concentration (unit: mol/l) and the flow speed (unit: ml/min) of the first raw material, the concentration (unit: mol/l) and the flow speed (unit: ml/min) of the second raw material, the shape of the merging portion, the reaction path diameter Φ (unit: mm), the reaction path length L (unit: m), and the reaction temperature (unit: ° C.). Note that the concentrations of the first raw material and the second raw material are adjusted in advance.

The system controller 13 comprehensively controls the entire operation of the flow reaction device 11. The system controller 13 is connected to the first raw material supply unit 21, the second raw material supply unit 22, the temperature adjustment unit 24, the first flow speed sensor 33a, the second flow speed sensor 33b, the third flow speed sensor 33c, the temperature sensor 34, and the switching valve provided in the recovery section 25.

The system controller 13 controls the rotation speed of the pump of the first raw material supply unit 21 and adjusts the flow rate of the first raw material according to the flow speed of the first raw material detected by the first flow speed sensor 33a In the same manner, the system controller 13 controls the rotation speed of the pump of the second raw material supply unit 22 and adjusts the flow rate of the second raw material according to the flow speed of the second raw material detected by the second flow speed sensor 33b. In addition, the system controller 13 drives the temperature adjustment unit 24 according to the reaction temperature detected by the temperature sensor 34. Further, the system controller 13 controls the switching valve provided in the recovery section 25.

The search device 12 performs condition search processing of deciding the optimum reaction condition for the flow reaction processing performed by the flow reaction device 11. In the present embodiment, the search device 12 searches for a value (optimum solution) of each item of the reaction conditions in which the dispersion which a result parameter achieves which target value. The search device 12 registers the optimum reaction condition obtained by the search in the system controller 13.

Figure 2:
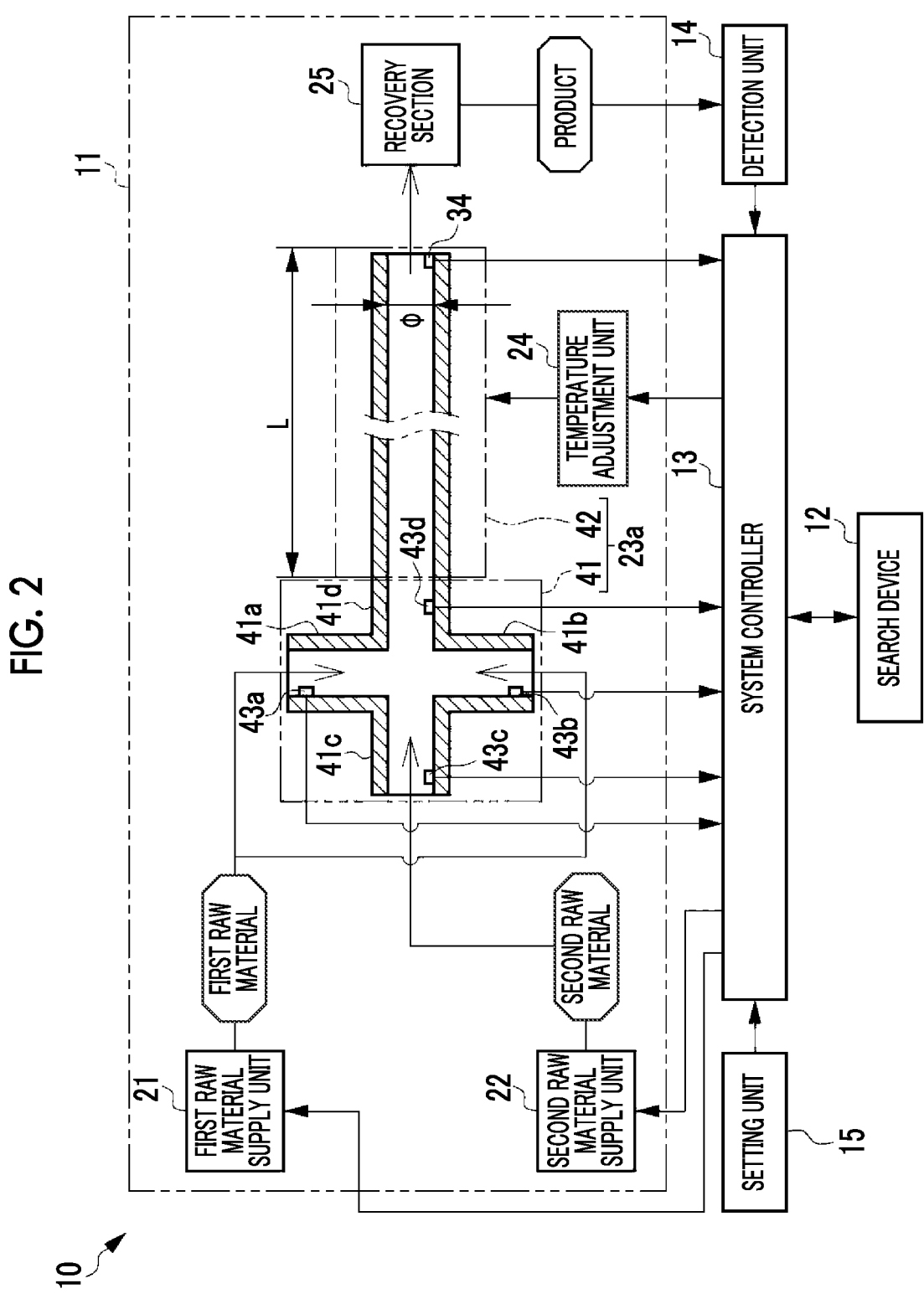
FIG. 2 is a diagram showing the flow reaction equipment including a reaction section having a merging portion having a cross shape.

A reaction section 23a shown in FIG. 2 can be used instead of the reaction section 23. Note that, in FIG. 2, the same components as those in FIG. 1 are designated by the same reference numerals, and the description thereof will be omitted.

In FIG. 2, the reaction section 23a includes a merging portion 41 and a reaction portion 42. The merging portion 41 is configured by a first pipe portion 41a, a second pipe portion 41b, a third pipe portion 41c, and a fourth pipe portion 41d, which are connected to communicate with each other. The first pipe portion 41a and the second pipe portion

41b are connected to each other in a straight line. The third pipe portion 41c and the fourth pipe portion 41d are connected to each other in a straight line. In addition, the first pipe portion 41a and the second pipe portion 41b are connected to be orthogonal to the third pipe portion 41c and the fourth pipe portion 41d. That is, a shape of the merging portion 41 is a cross shape.

The first raw material supply unit 21 is connected to the first pipe portion 41a and the second pipe portion 41b. The second raw material supply unit 22 is connected to the third pipe portion 41c. The fourth pipe portion 41d is connected to the reaction portion 32. The first raw material is supplied from the first raw material supply unit 21 to the first pipe portion 41a and the second pipe portion 41b. The second raw material is supplied from the second raw material supply unit 22 to the third pipe portion 41c. The first raw material supplied to the first pipe portion 41a and the second pipe portion 41b, and the second raw material supplied to the third pipe portion 41c merge in the fourth pipe portion 41d, and are sent to the reaction portion 32 as the mixture of the first raw material and the second raw material.

The first pipe portion 41a is provided with a first flow speed sensor 43a that detects a flow speed of the first raw material passing through the first pipe portion 41a. The second pipe portion 41b is provided with a second flow speed sensor 43b that detects a flow speed of the first raw material passing through the second pipe portion 41b. The third pipe portion 41c is provided with a third flow speed sensor 43c that detects a flow speed of the second raw material passing through the third pipe portion 41c. Further, the fourth pipe portion 41d is provided with a fourth flow speed sensor 43d that detects a flow speed of the mixture of the first raw material and the second raw material passing through the fourth pipe portion 41d.

Each of detection signals of the first flow speed sensor 43a, the second flow speed sensor 43b, the third flow speed sensor 43c, and the fourth flow speed sensor 43d is output to the system controller 13.

In this case, the system controller 13 controls the rotation speed of the pump of the first raw material supply unit 21 according to an average value of the flow speed of the first raw material detected by the first flow speed sensor 43a and the flow speed of the first raw material detected by the second flow speed sensor 43b, and adjusts the flow rate of the first raw material. In addition, the system controller 13 controls the rotation speed of the pump of the second raw material supply unit 22 and adjusts the flow rate of the second raw material according to the flow speed of the second raw material detected by the third flow speed sensor 43c.

In addition to the items described above, the setting unit 15 receives the shape of the merging portion of the reaction section as a setting item and registers the shape of the merging portion in the system controller 13 as one item of the condition data. For example, in a case in which the reaction section 23 shown in FIG. 1 is used, the information indicating that the shape of the merging portion is "T-shape" is registered in the system controller 13 via the setting unit 15. In addition, in a case in which the reaction section 23 shown in FIG. 2 is used, the information indicating that the shape of the merging portion is "cross shape" is registered in the system controller 13 via the setting unit 15.

In a case in which the reaction section 23 is used, the system controller 13 controls the rotation speed of the pump of the first raw material supply unit 21 and adjusts the flow rate of the first raw material such that the flow speed of the first raw material detected by the first flow speed sensor 33a and the registered flow speed of the first raw material match. Similarly, the system controller 13 controls the rotation speed of the pump of the second raw material supply unit 22 and adjusts the flow rate of the second raw material such that the flow speed of the second raw material detected by the second flow speed sensor 33*b* matches the registered flow speed of the second raw material.

In a case in which the reaction section 23*a* is used, the system controller 13 calculates the average value of the flow speed of the first raw material detected by the first flow speed sensor 43*a* and the flow speed of the first raw material detected by the second flow speed sensor 43*b*. The system controller 13 controls the rotation speed of the pump of the first raw material supply unit 21 and adjusts the flow rate of the first raw material such that the calculated average value matches the registered flow speed of the first raw material. Similarly, the system controller 13 controls the rotation speed of the pump of the second raw material supply unit 22 and adjusts the flow rate of the second raw material such that the flow speed of the second raw material detected by the third flow speed sensor 43*c* matches the registered flow speed of the second raw material.

In addition, the system controller 13 drives the temperature adjustment unit 24 such that the reaction temperature detected by the temperature sensor 34 matches the registered reaction temperature.

The system controller 13 controls the switching valve provided in the recovery section 25 and guides the disposal object to the second recovery unit in a case in which the deviation between the detection value of each sensor and each value registered in the system controller 13 exceeds a preset range.

Each of the system controller 13 and the search device 12 is configured by a computer. Note that the setting unit 15 may be a part of the computer configuring the system controller 13.

Figure 3:
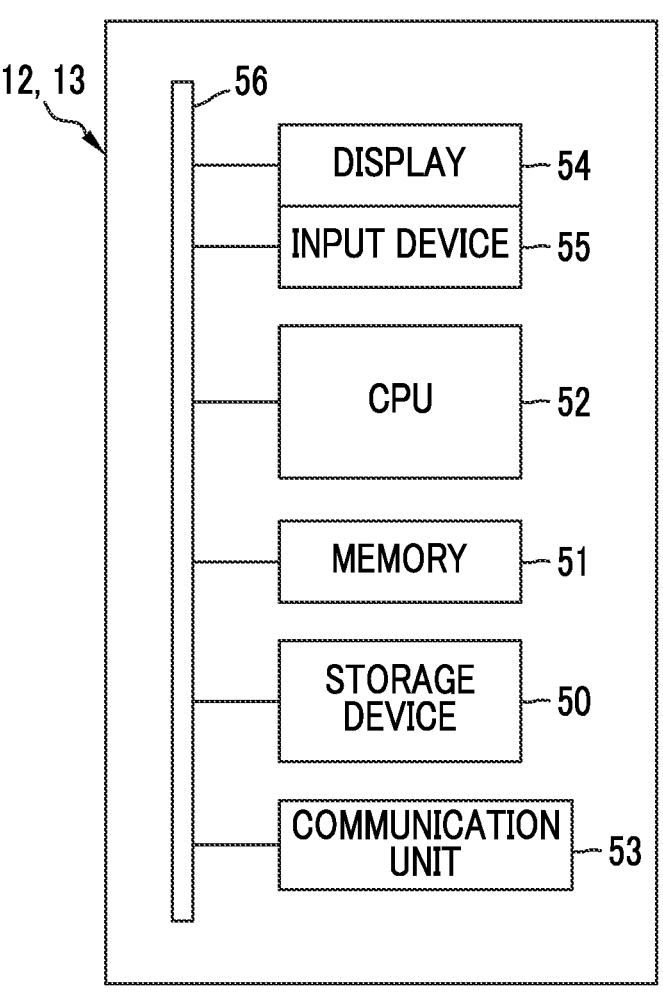
FIG. 3 is a block diagram showing a configuration of a computer.

In FIG. 3, the computer configuring the system controller 13 and the search device 12 comprises, for example, a storage device 50, a memory 51, a central processing unit (CPU) 52, a communication unit 53, a display 54, and an input device 55. These devices are mutually connected through a busline 56.

The storage device 50 is a hard disk drive, which is built in or connected to the computer via a cable or a network. The storage device 50 may be a disk array in which a plurality of hard disk drives are mounted. The storage device 50 stores a control program, such as an operating system, various application programs, various data associated with these programs, and the like. Note that a solid state drive may be used instead of or in addition to the hard disk drive.

The memory 51 is a work memory used by the CPU 52 to execute processing. The CPU 52 comprehensively controls each unit of the computer by loading the program stored in the storage device 50 to the memory 51 and executing the processing according to the program.

The communication unit 53 is a network interface that controls transmission of various pieces of information via the network connecting the system controller 13 and the search device 12. The display 54 is a display device that displays various screens. The computer receives an input of an operation instruction from the input device 55 through the various screens. The input device 55 is a keyboard, a mouse, or a touch panel, for example.

Note that the system controller 13 and the search device 12 may be integrally configured by one computer.

Figure 4:
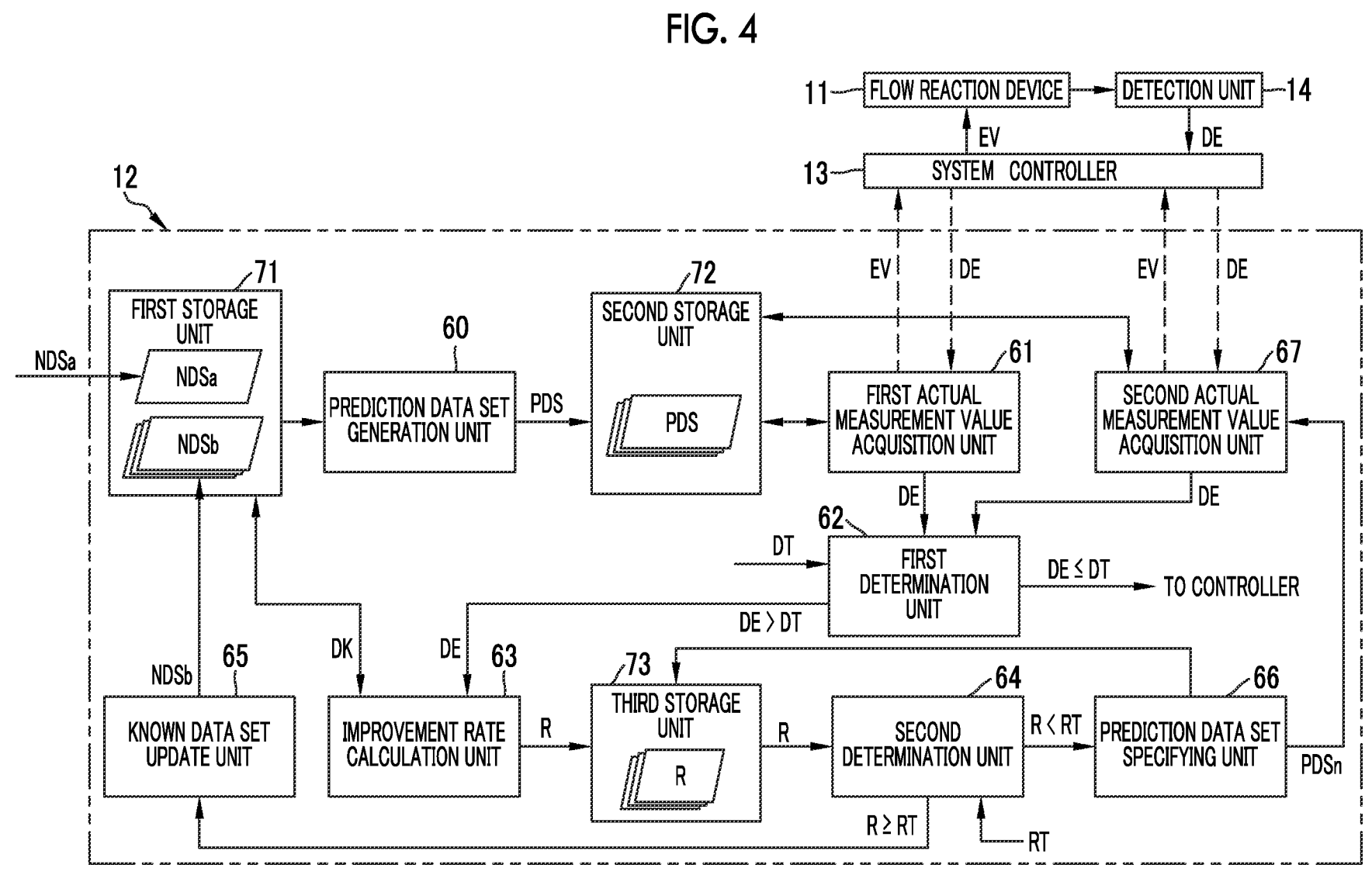

Then, a functional configuration of the search device 12 will be described. In FIG. 4, in the search device 12, a prediction data set generation unit 60, a first actual measurement value acquisition unit 61, a first determination unit 62, an improvement rate calculation unit 63, a second determination unit 64, and a known data set update unit 65, a prediction data set specifying unit 66, and a second actual measurement value acquisition unit 67 are provided. In addition, in the search device 12, a first storage unit 71, a second storage unit 72, and a third storage unit 73 are configured. These functional units are realized based on the operation program of the search device 12 stored in the storage device 50 of the computer and hardware resources operated by the operation program.

Figure 5:
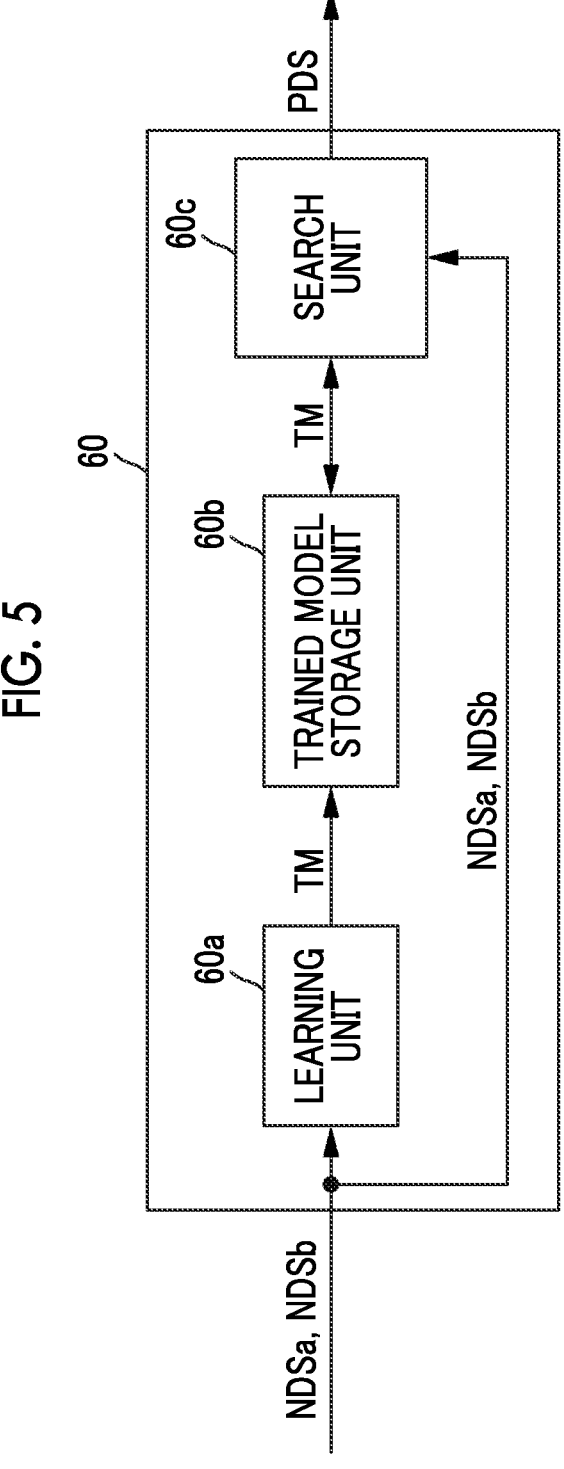
FIG. 5 is a block diagram showing a functional configuration of a prediction data set generation unit.

In addition, as shown in FIG. 5, the prediction data set generation unit 60 is configured by a learning unit 60*a*, a trained model storage unit 60*b*, and a search unit 60*c*.

The first storage unit 71 stores a known data set NDSa as supervised data acquired in advance. The known data set NDSa is composed of a plurality of known data in which a value of each item (condition parameter) of the reaction conditions described above and a value of the reaction result (result parameter) are associated with each other. The prediction data set generation unit 60 generates a prediction data set PDS representing a prediction value of the reaction result for a value of an unknown reaction condition that is not present in the known data set NDSa, based on the known data set NDSa.

FIG. 6 shows the known data set NDSa. In the example shown in FIG. 6, the known data set NDSa is composed of, for example, 10 sets of known data (Nos. 1 to 10). Each known data is associated with the value of each item of the reaction conditions and an actual measurement value of the reaction result. The actual measurement value of the reaction result is the value of the dispersion detected by the detection unit 14. The known data set NDSa is created in advance before the condition search processing is performed by the search device 12, and is stored in the storage device 50 as a data storage unit. The number of known data composing the known data set NDSa may be appropriately changed.

Note that "NDS 1" shown in FIG. 6 is identification information for identifying individual known data sets NDSa and NDSb. The known data set NDSb is a known data set updated by the known data set update unit 65 described below. Regarding the identification information, the known data sets NDSa. and NDSb are not distinguished, and NDSn (n=1, 2, 3, . . . ) is set in the order stored in the first storage unit 71.

The prediction data set generation unit 60 generates a trained model TM by performing machine learning using the known data set NDSa as the supervised data based on a learning model M by the learning unit 60*a*. The trained model TM is a function representing a relationship between the condition parameter as the explanatory variable and the result parameter as the response variable. In the present embodiment, the learning model M is composed of a neural network. Note that the learning model M is not limited to the neural network, but may be obtained by linear regression, Gaussian process regression, support vector regression, decision tree, ensemble method, bagging method, boosting method, gradient boosting method, or the like.

The neural network can be constructed by using a commercially available neural network fitting application. For example, the neural network can be constructed by using Matlab Neural Fitting tool manufactured by The Math-Works, Inc. Note that as the neural network fitting application, it is also possible to use a keras package manufactured by RStudio, PBC, which can operate on the R language.

Figure 7:
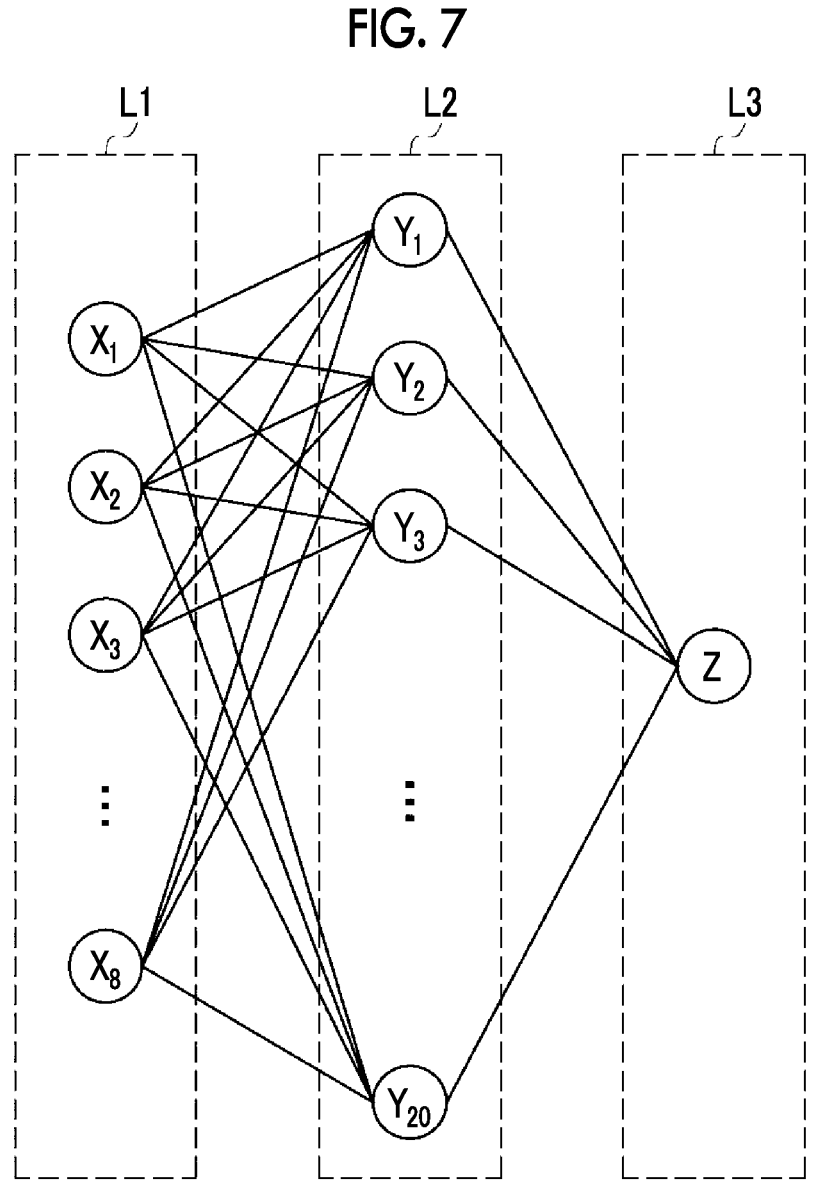
FIG. 7 is a diagram showing a configuration of a neural network.

As shown in FIG. 7, for example, the learning model M composed of a neural network has a layer structure of an input layer L1, interlayer L2, and an output layer L3. The input layer L1 includes a node to which a condition parameter $X_i$ (here, i=1, 2, . . . , 8), which is the explanatory variable, is input. The output layer L3 includes a node representing a result parameter Z, which is the response variable. $Y_j$ (here, j=1, 2, . . . , 20) is a parameter represented by each node of the interlayer L2.

For example, the relationship between the condition parameter $X_i$ and the result parameter Z is represented by Mathematical Expression (1). Here, $W_{X_iY_j}$ and $W_{Y_jZ}$ are weight coefficients.

$$Z = W_{Y1Z}/[1 + \exp\{-(W_{X1Y1} \times X_1 + W_{X2Y1} \times X_2 + \ldots W_{X8Y1} \times X_8)\}] + \quad (1)$$
$$W_{Y2Z}/[1 + \exp\{-(W_{X1Y2} \times X_1 + W_{X2Y2} \times X_2 + \ldots W_{X8Y2} \times X_8)\}] +$$
$$\ldots +$$
$$W_{Y20Z}/[1 + \exp\{-(W_{X1Y20} \times X_1 + W_{X2Y20} \times X_2 + \ldots W_{X8Y20} \times X_8)\}]$$

Note that the number of nodes included in each layer of the neural network and the number of interlayers can be appropriately changed.

The learning unit 60a obtains the optimum weight coefficients $W_{X_iY_j}$ and $W_{Y_jZ}$ by repeatedly updating the weight coefficients $W_{X_iY_j}$ and $W_{Y_jZ}$ by machine learning based on the known data set NDSa. The learning unit 60a generates the trained model TM by applying the obtained optimum weight coefficients $W_{X_iY_j}$ and $W_{Y_jZ}$ to the learning model M.

The trained model storage unit 60b stores the learning model M generated by the learning unit 60a.

The search unit 60c generates the prediction data set PDS by executing the search algorithm based on the known data set NDSa and the trained model TM stored in the trained model storage unit 60b. The prediction data set PDS is composed of a plurality of prediction data in which the explanatory variable (condition parameter $X_i$) for which a value of the response variable (result parameter Z) is unknown and the prediction value of the response variable are associated with each other.

The search algorithm is a genetic algorithm, for example. By using the value of the explanatory variable as an individual and the value of the response variable as an evaluation value, the search unit 60c generates a set (prediction data set) of the individual having the high evaluation value and the evaluation value by repeating selection, crossover, and mutation.

Figure 8:
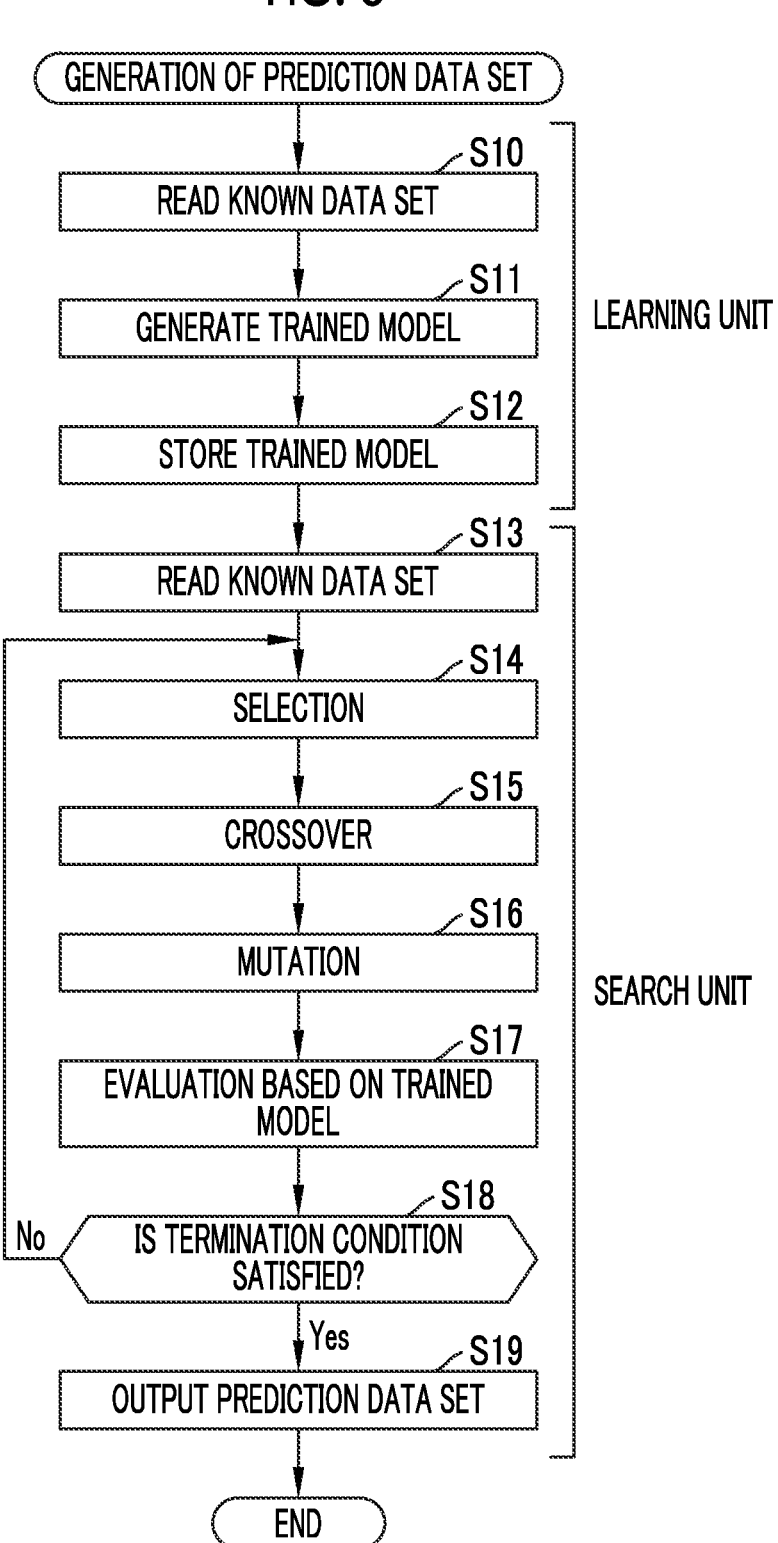
FIG. 8 is a flowchart showing a processing procedure of the prediction data set generation unit.

Specifically, the prediction data set generation unit 60 performs an operation according to a procedure shown in FIG. 8, for example. First, the learning unit 60a reads the known data set NDSa from the first storage unit 71 (step S10), and generates the trained model TM by performing machine learning by using the known data set NDSa (step S11). The trained model storage unit 60b stores the trained model TM generated by the learning unit 60a (step S12).

Then, the search unit 60c reads the known data set NDSa from the first storage unit 71 (step S13). Then, the search unit 60c selects a plurality of known data with high evaluation from the known data set NDSa based on the value of the response variable as the evaluation value (dispersion in the present embodiment) (step S14), Since the smaller dispersion as the evaluation value is better, the search unit 60c selects the known data having the dispersion equal to or less than a certain value from the known data set NDSa.

Then, the search unit 60c performs the crossover in which the value of a part of the explanatory variables are exchanged between any two sets of known data among the selected plurality of known data (step S15). Then, the search unit 60c causes the mutation in which the value of a part of the explanatory variables is changed (step S16). Then, the search unit 60c inputs the values of the explanatory variables generated by the selection, the crossover, and the mutation to the trained model TM stored in the trained model storage unit 60b, and calculates the dispersion as the evaluation value (step S17).

Then, the search unit 60c determines whether or not a termination condition is satisfied based on each evaluation value (step S18). Specifically, the search unit 60c specifies the evaluation value closest to the target value DT in the known data set NDSa as a reference value DK, and determines the termination in a case in which a certain number or more of the evaluation values exceeding the reference value DK are obtained.

In the present embodiment, the evaluation value is the dispersion. The dispersion is a positive value, and the smaller dispersion is better (evaluation is better). In the present embodiment, for example, the target value DT is set to 1.04. In the example shown in FIG. 6, since the dispersion of the known data No. 4 is 1.20, which is the closest to the target value DT, the reference value DK is 1.20. In step S18, the determination is made as the termination in a case in which a certain number or more of dispersions less than the reference value DK are obtained.

In a case in which the determination is made in step S18 that the termination condition is not satisfied, the search unit 60c returns the processing to step S14 again. In step S14, the selection, the crossover, and the mutation are performed, and the selection is performed based on the evaluation value obtained in step S17.

In a case in which the determination is made in step S18 that the termination condition is satisfied, the search unit 60c outputs the prediction data set PDS consisting of a plurality of data in which the evaluation value (dispersion) exceeding the specified evaluation value and the explanatory variable (reaction condition) are associated with each other (step S19).

FIG. 9 shows the prediction data set PDS generated by the prediction data set generation unit 60 based on the known data set NDSa shown in FIG. 6. In the example shown in FIG. 9, the prediction data set PDS is composed of eight sets of prediction data (Nos. 1 to 8). Each prediction data is associated with the value of each item of the reaction conditions and the prediction value of the reaction result.

Note that "PDS1" shown in FIG. 9 is identification information for identifying the individual prediction data set PDS. Regarding the identification information, the prediction data set PDS is set to PDSn (n=1, 2, 3, . . . ) in the order stored in the first storage unit 71.

In FIG. 4, the second storage unit 72 stores the prediction data set PDS generated by the prediction data set generation unit 60. The first actual measurement value acquisition unit 61 acquires an actual measurement value DE of the response variable (dispersion) for a value EV of the explanatory variable (reaction condition) in which the prediction value is included in the prediction value DS closest to the target value DT in the prediction data set PDS stored in the second storage unit 72.

Specifically, the first actual measurement value acquisition unit 61 registers the value EV of the reaction condition included in the prediction data closest to the target value DT in the system controller 13, operates the flow reaction device 11 at the value EV of the reaction condition, and acquires the actual measurement value DE of the dispersion from the detection unit 14. For example, in the example shown in FIG. 9, since the dispersion of the prediction data No. 1 is 1.12, which is the prediction value DS closest to the target value DT, the value EV of the reaction condition included in the prediction data No. 1 is registered in the system controller 13 and the flow reaction device 11 is operated.

The first determination unit 62 compares the actual measurement value DE acquired by the first actual measurement value acquisition unit 61 with the target value DT, and supplies the actual measurement value DE to the improvement rate calculation unit 63 in a case in which the actual measurement value DE is more than the target value DT. In a case in which the actual measurement value DE is equal to or less than the target value DT (the target value is achieved), the first determination unit 62 registers the value EV of the reaction condition for which the actual measurement value DE is acquired in the system controller 13, and uses the value EV to operate the flow reaction device 11.

The improvement rate calculation unit 63 obtains an improvement rate R (unit: percentage) of the reaction result (dispersion) by using Mathematical Expression (2) based on the reference value DK and the actual measurement value DE.

$$R = (DK - DE) \times 100/DK \qquad (2)$$

For example, in a case in which the actual measurement value DE acquired by the first actual measurement value acquisition unit 61 is 1.16, the improvement rate R is about 3.3%. This fact means that the actual measurement value DE under the new reaction conditions obtained by the condition search processing shown in FIG. 8 approaches the target value DT by about 3.3% from the reference value DK, which is the closest actual measurement value to the latest target value DT.

The third storage unit 73 stores the improvement rate R calculated by the improvement rate calculation unit 63. The improvement rate R calculated by the improvement rate calculation unit 63 is input to the second determination unit 64 via the third storage unit 73.

Figure 10:
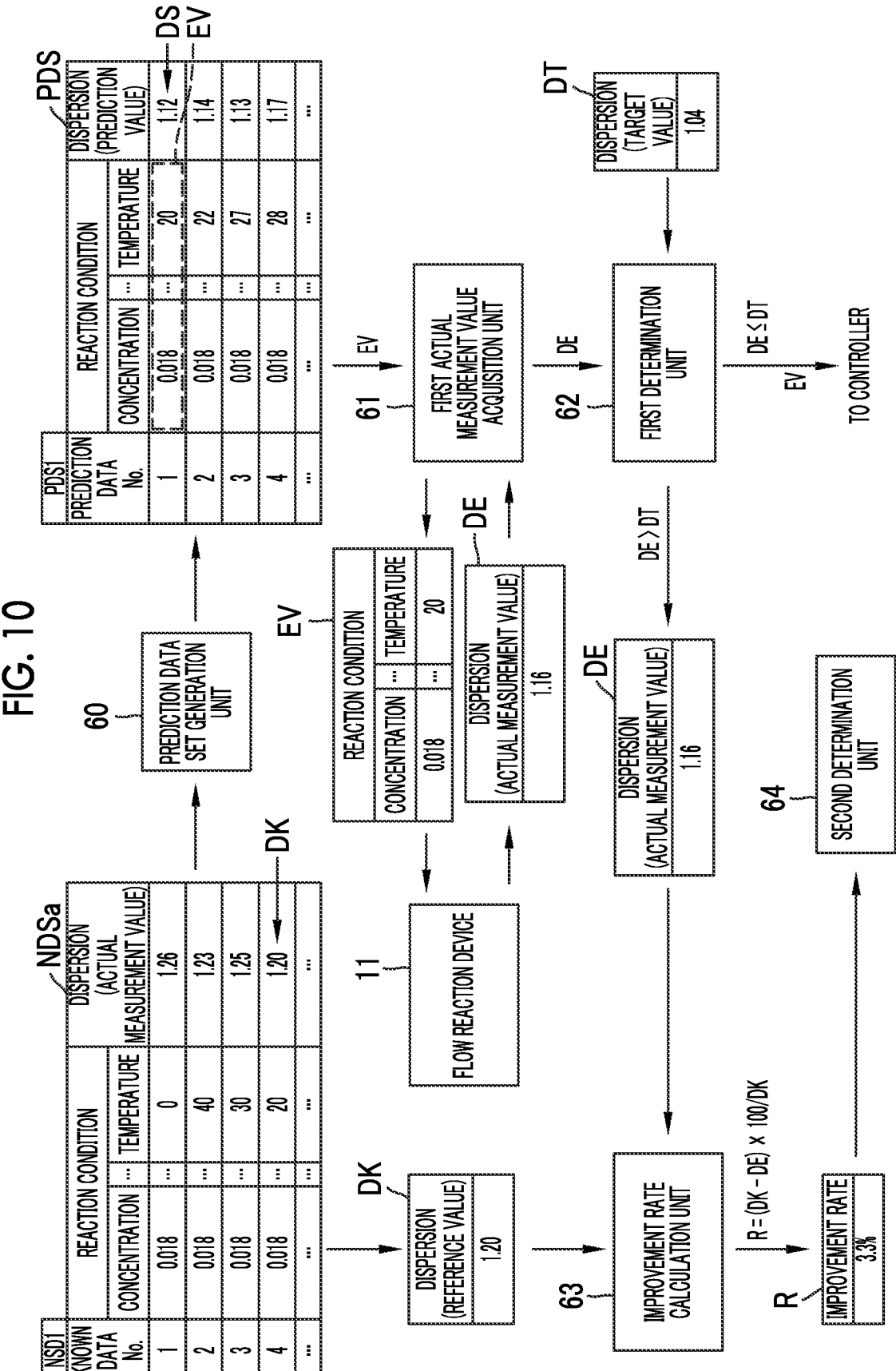
FIG. 10 is a schematic diagram showing a process in which the prediction data set is generated from the known data set, actual measurement is performed, and an improvement rate of an actual measurement value is calculated.

FIG. 10 schematically shows a process from the generation of the prediction data set PDS from the known data set NDSa to the actual measurement and the calculation of the improvement rate R of the actual measurement value DE.

In FIG. 4, the second determination unit 64 compares the improvement rate R with the target improvement rate RI, and inputs a comparison result to the known data set update unit 65 and the prediction data set specifying unit 66.

In a case in which the improvement rate R is equal to or higher than the target improvement rate RT, the known data set update unit 65 updates the known data set NDSa to the new known data set NDSb by adding the actual measurement value DE and the value EV of the explanatory variable (reaction condition) corresponding to the actual measurement value DE to the known data set NDSa.

For example, in a case in which the target improvement rate RT is 3%, the improvement rate R is about 3.3%, which is equal to or higher than the target improvement rate RT. In this case, as shown in FIG. 11, the known data set update unit 65 adds 1.16, which is the actual measurement value DE of the prediction value DS closest to the target value DT and the value EV of the reaction condition corresponding to the prediction value DS to the known data set NDSa as the known data No. 11. In this way, the new known data set NDSb is generated. In the new known data set NDSb, the added actual measurement value of the known data No. 11 is the reference value DK closest to the target value DT.

Figure 12:
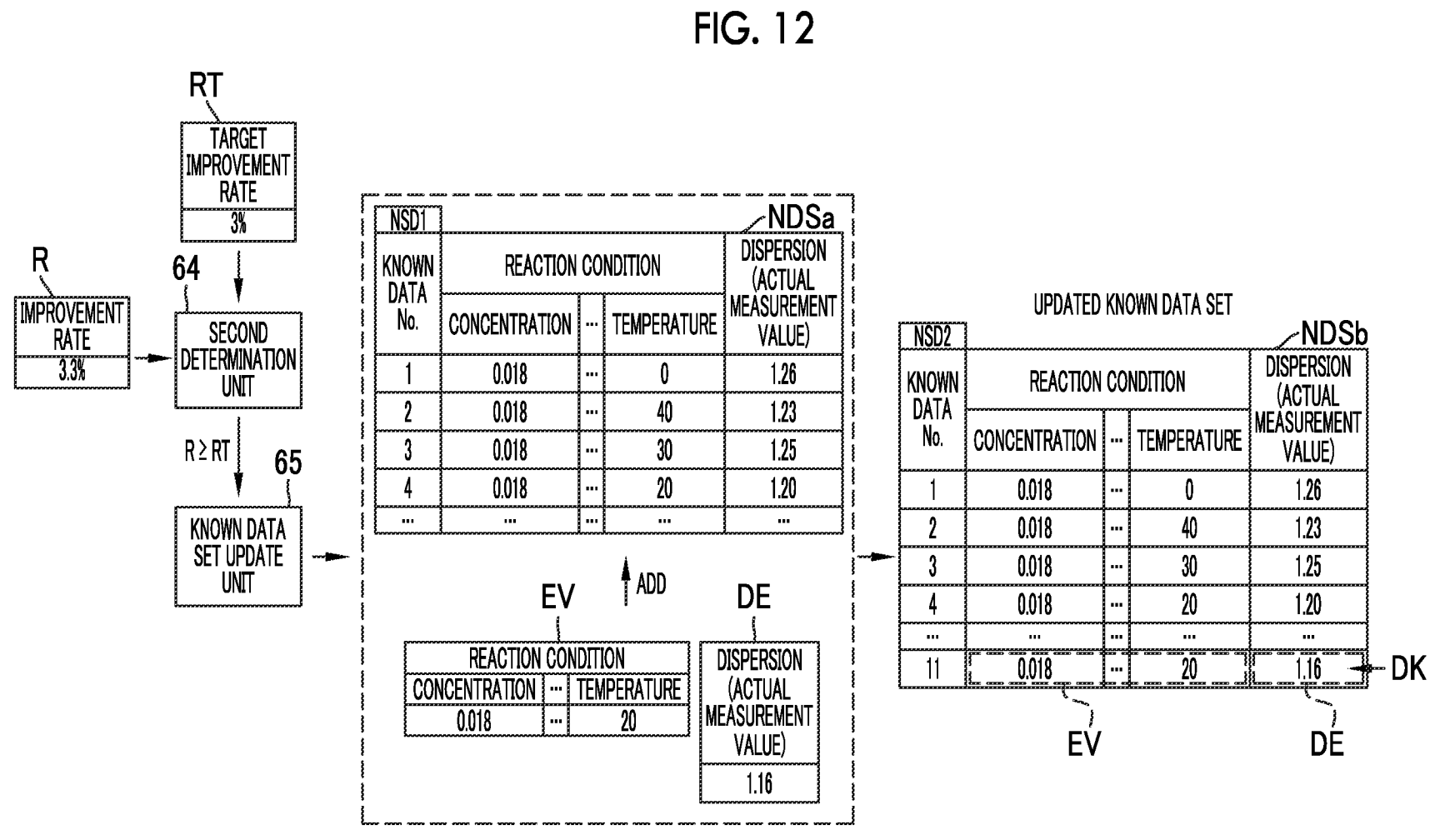

FIG. 12 schematically shows a process in which the known data set NDSa is updated to the new known data set NDSb in a case in which the improvement rate R is equal to or higher than the target improvement rate RT.

In FIG. 4, the first storage unit 71 stores the new known data set NDSb generated by the known data set update unit 65. The prediction data set generation unit 60 described above reads the known data set NDSb updated by the known data set update unit 65 and performs the same processing to generate the new prediction data set PDS. The second storage unit 72 stores the new prediction data set PDS generated by the prediction data set generation unit 60.

The known data set NDSa and the known data set NDSb generated by the known data set update unit 65 are accumulated in the first storage unit 71. The prediction data set PDS generated by the prediction data set generation unit 60 is accumulated in the second storage unit 72.

FIG. 13 shows the new prediction data set PDS generated by the prediction data set generation unit 60 based on the known data set NDSb shown in FIG. 11. In the new prediction data set PDS, the prediction value DS closest to the target value DT is the prediction value of the prediction data. No. 4. Therefore, the actual measurement value DE is acquired by the first actual measurement value acquisition unit 61 by using the value EV of the reaction condition included in the prediction data No. 4.

The actual measurement value DE acquired by the first actual measurement value acquisition unit 61 is, for example, 1.09. Since the actual measurement value DE is larger than the target value DT, the improvement rate R is calculated by the improvement rate calculation unit 63, and the calculated improvement rate R is about 6%. In this case, since the improvement rate R is equal to or higher than the target improvement rate RT, the known data set update unit 65 generates the new known data set NDSb again.

FIG. 14 shows the new known data set NDSb generated again by the known data set update unit 65. In the new known data set NDSb, the added actual measurement value of the known data. No. 12 is the reference value DK closest to the target value DT.

The process in which the new known data set NDSb shown in FIG. 14 is generated again from the new known data set NDSb shown in FIG. 11 is the same as the processes shown in FIGS. 10 and 12.

FIG. 15 shows the new prediction data set PDS generated by the prediction data se generation unit 60 based on the known data set NDSb shown in FIG. 14. In the new prediction data set PDS, the prediction value DS closest to the target value DT is the prediction value of the prediction data. No. 4. Therefore, the actual measurement value DE is acquired by the first actual measurement value acquisition unit 61 by using the value EV of the reaction condition included in the prediction data No. 4.

In this case, the actual measurement value DE acquired by the first actual measurement value acquisition unit 61 is, for example, 1.06. Since the actual measurement value DE is larger than the target value DT, the improvement rate R is calculated by the improvement rate calculation unit 63. The improvement rate R calculated by the improvement rate calculation unit 63 is about 2.8%. In this way, in a case in which the calculated improvement rate R is less than the target improvement rate RT, the prediction data set specifying unit 66 is operated.

In FIG. 4, the prediction data set specifying unit 66 specifies the prediction data set PDS generated by the prediction data set generation unit 60 with reference to the data of the past improvement rate R accumulated in the third storage unit 73, and based on the known data set NDSb generated by the known data set update unit 65 immediately after obtaining the largest improvement rate R in the past.

For example, in the examples shown in FIGS. 9, 11, and 13 to 15, the maximum improvement rate R is about 6%, and the known data set NDSb updated immediately after this is the known data set NDSb shown in FIG. 14. Moreover, the prediction data set PDS generated based on the known data set NDSb shown in FIG. 14 is the prediction data set PDS shown in FIG. 15, Therefore, the prediction data set PDS specified by the prediction data set specifying unit 66 is the prediction data set PDS shown in FIG. 15.

The prediction data set specifying unit 66 supplies the identification information of the specified prediction data set PDS to the second actual measurement value acquisition unit 67. For example, in the example described above, the prediction data set specifying unit 66 supplies the specified identification information (PDS3) for identifying the prediction data set PDS shown in FIG. 15 to the second actual measurement value acquisition unit 67.

The second actual measurement value acquisition unit 67 extracts the prediction data set corresponding to the identification information supplied from the prediction data set specifying unit 66 from a plurality of the prediction data set PDS stored in the second storage unit 72. Moreover, the second actual measurement value acquisition unit 67 acquires the actual measurement value DE of the response variable (dispersion) for the value of the explanatory variable (reaction condition) included in the prediction data, which is not used for acquiring the actual measurement value DE by the first actual measurement value acquisition unit 61, in the extracted prediction data set PDS.

For example, in a case in which the prediction data set PDS shown in FIG. 15 is specified by the prediction data set specifying unit 66, the prediction data No. 4 is already used for acquiring the actual measurement value DE by the first actual measurement value acquisition unit 61, and thus the actual measurement value DE is acquired based on any one prediction data among the prediction data Nos. 1 to 3.

Specifically, the second actual measurement value acquisition unit 67 acquires the actual measurement value DE based on the prediction data including the value of the explanatory variable deviating from the value of the explanatory variable included in the prediction data used by the first actual measurement value acquisition unit 61 by a value equal to or more than a threshold value. The second actual measurement value acquisition unit 67 calculates a deviation rate δ for each item of the explanatory variable (reaction condition). The deviation rate δ is calculated by using Mathematical Expression (3) in a case in which the value of the explanatory variable included in the prediction data, which is used for acquiring the actual measurement value DE by the first actual measurement value acquisition unit 61, is defined as Xa, and the value of the explanatory variable included in the prediction data, which is not used for acquiring the actual measurement value DE by the first actual measurement value acquisition unit 61, is defined as Xb.

$$\delta = |Xa - Xb| \times 100/Xa \qquad (3)$$

Figure 16:
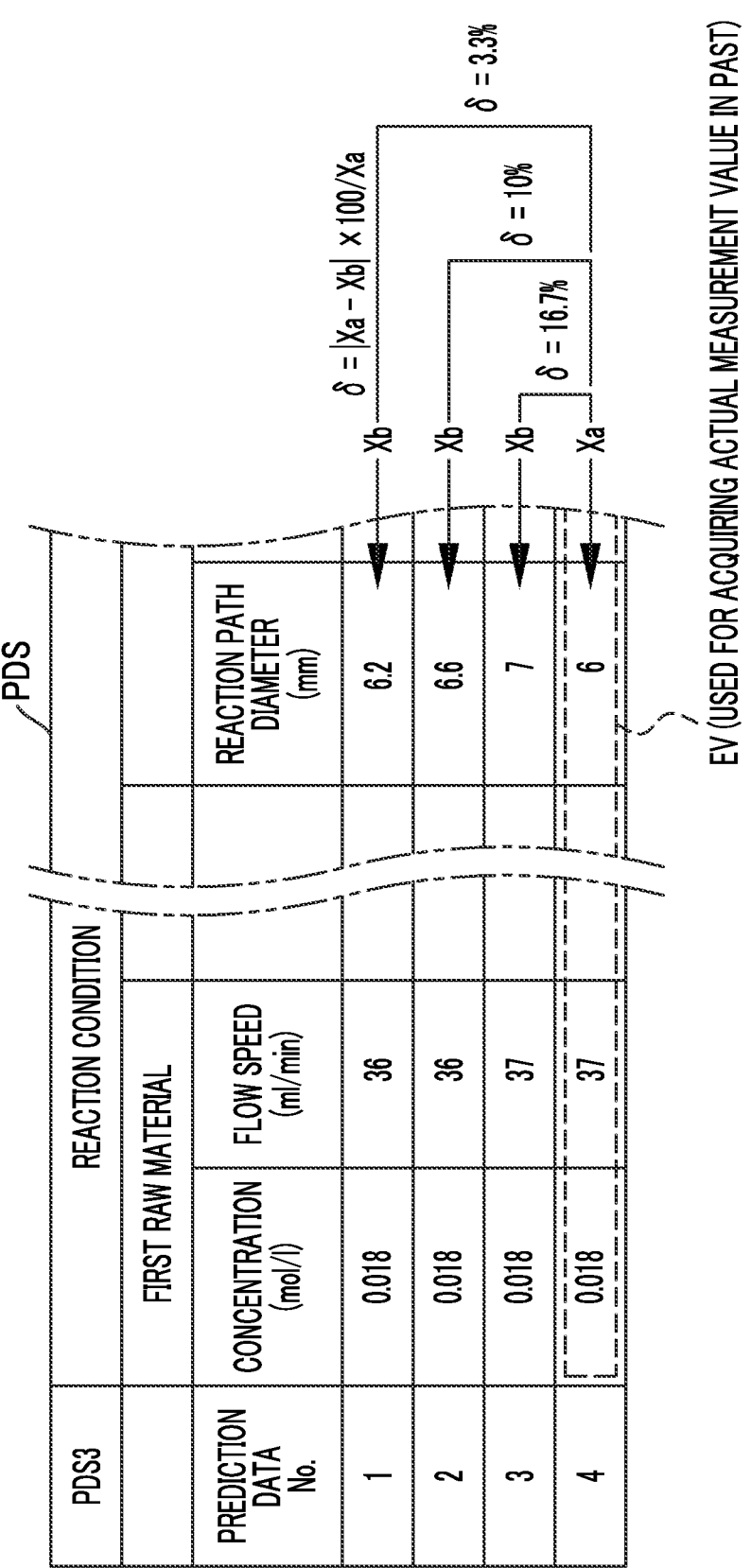
FIG. 16 is a schematic diagram describing a calculation method of a deviation rate.

For example, in a case of the prediction data set PDS shown in FIG. 15, as shown in FIG. 16, the second actual measurement value acquisition unit 67 calculates the deviation rated for each item of the prediction data Nos. 1 to 3 from each item of the prediction data No. 4. The deviation rates δ of the prediction data Nos. 1 to 3 from the reaction path diameters are 3.3%, 10%, and 16.7%, respectively. In a case in which the threshold value is 5%, the deviation rates d the prediction data Nos. 2 and 3 from the reaction path diameters are equal to or more than the threshold value.

Further, the second actual measurement value acquisition unit 67 acquires the actual measurement value DE by selecting the prediction data in which the prediction value is closest to the target value DT in a case in which a plurality of the prediction data including the value of the explanatory variable (reaction condition) deviating from the value of the explanatory variable included in the prediction data used by the first actual measurement value acquisition unit by the value equal to or more than the threshold value are present. For example, in a case of the prediction data set PDS shown in FIG. 15, the prediction value of the prediction data No. 2 is closer to the target value DT among the prediction data Nos. 2 and 3 in which the deviation rate δ is equal to or more than the threshold value, Therefore, the second actual measurement value acquisition unit 67 acquires the actual measurement value DE by selecting the prediction data No. 2.

Figure 17:
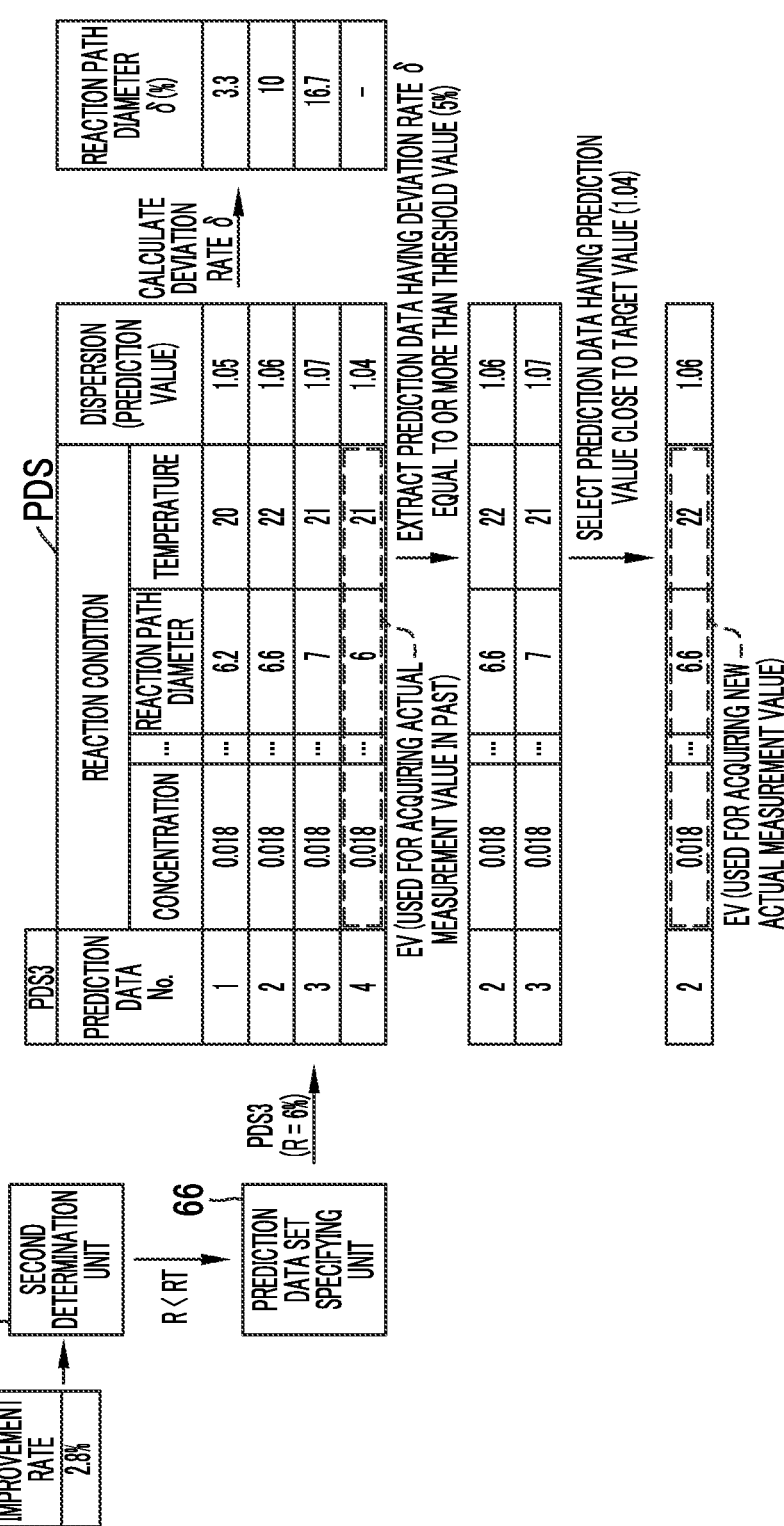
FIG. 17 is a schematic diagram showing a process of selecting the prediction data to be used for acquiring the actual measurement value based on the deviation rate and a target value.

FIG. 17 schematically shows a process of selecting the prediction data used for acquiring the actual measurement value based on the deviation rate δ and the target value DT. The second actual measurement value acquisition unit 67 acquires the actual measurement value DE by using the value EV of the reaction condition included in the prediction data, which is selected based on the deviation rate δ and the target value DT.

Acquisition processing of other actual measurement values DE by the second actual measurement value acquisition unit 67 is the same as the acquisition processing of the actual measurement value DE by the first actual measurement value acquisition unit 61. The actual measurement value DE acquired by the second actual measurement value acquisition unit 67 is input to the first determination unit 62, and the same determination processing is performed. In a case in which the actual measurement value DE is more than the target value DT, the improvement rate calculation unit 63 calculates the improvement rate R based on the actual measurement value DE. Note that the reference value DK used for calculating the improvement rate R in this case is based on the known data set NDSb updated by the known data set update unit 65 immediately after obtaining the largest improvement rate R in the past.

For example, in a case in which the actual measurement value DE acquired by the second actual measurement value acquisition unit 67 is 1.05, the reference value DK is 1.09, so that the improvement rate calculation unit 63 calculates the improvement rate R, which is about 3.7%. In this case, since the improvement rate R is equal to or higher than the target improvement rate RT, the known data set update unit 65 generates the new known data set NDSb again. Specifically, as shown in FIG. 18, the new known data set NDSb is generated by adding 1.05, which is the actual measurement value DE acquired by the second actual measurement value acquisition unit 67 and the value EV of the reaction condition of the prediction data No. 2 shown in FIG. 15 to the known data set NDSb shown in FIG. 14.

FIG. 19 shows the new prediction data set PDS generated by the prediction data set generation unit 60 based on the known data set NDSb shown in FIG. 18. In the new prediction data set PDS, the prediction value DS closest to the target value DT is the prediction value of the prediction data No. 3. The actual measurement value DE is acquired by the first actual measurement value acquisition unit 61 by using the value EV of the reaction condition included in the prediction data No. 3.

The actual measurement value DE acquired by the first actual measurement value acquisition unit 61 is, for example, 1.04. In this case, since the actual measurement value DE achieves the target value DT, the reaction condition for which the actual measurement value DE is acquired is set in the flow reaction device 11 via the system controller 13, and is used for the operation of the flow reaction device 11.

Figure 20:
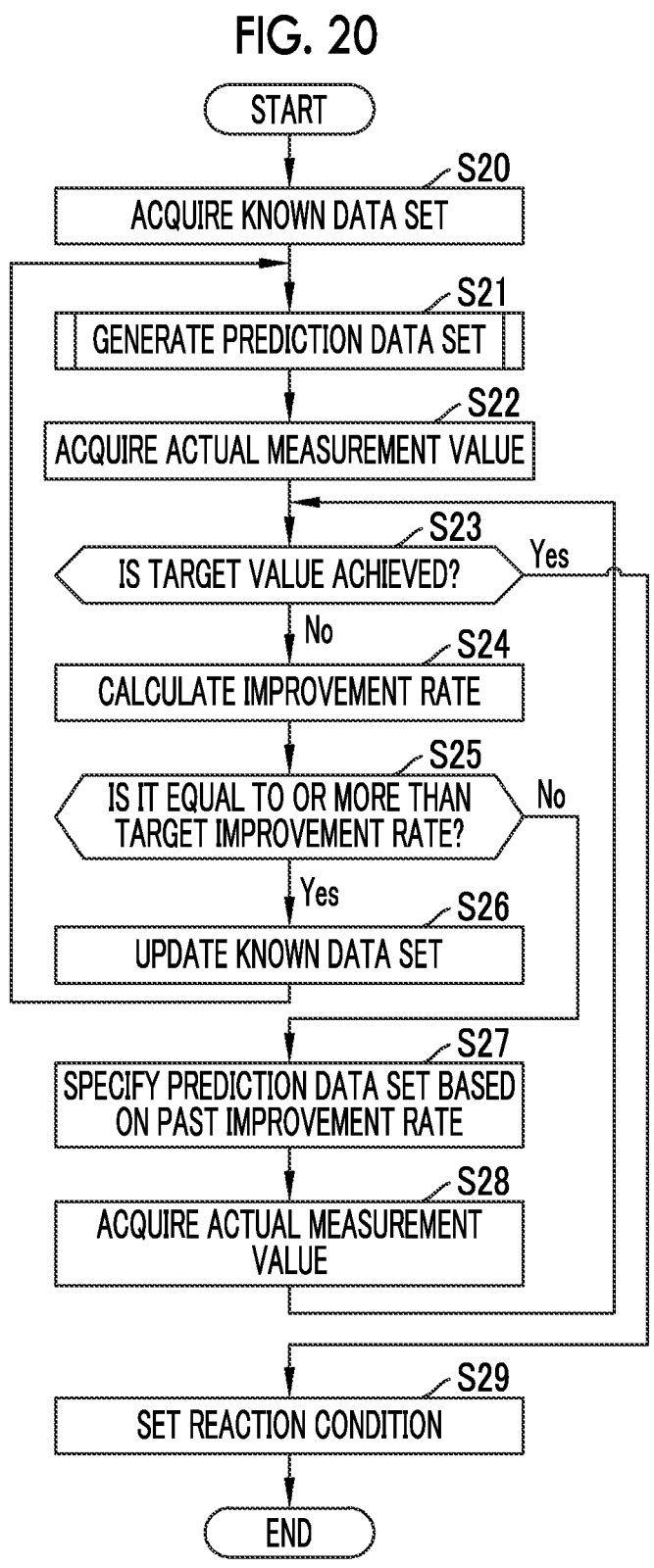
FIG. 20 is a flowchart showing a series of operations of the flow reaction equipment.

Then, a series of operations of the flow reaction equipment 10 will be described with reference to the flowchart shown in FIG. 20. First, the search device 12 acquires the known data set NDSa obtained by the system controller 13 operating the flow reaction device 11 based on the reaction conditions registered in the system controller 13 (step S20).

Then, in the search device 12, the prediction data set generation unit 60 generates the prediction data set PDS in which the reaction result (dispersion) is closer to the target value DT than the known data set NDSa based on the known data set NDSa (step S21), The generation of the prediction data set PDS is performed by the procedure shown in FIG. 8.

Then, the first actual measurement value acquisition unit 61 acquires the actual measurement value DE of the reaction result (dispersion) by the flow reaction device 11 using the reaction condition included in the prediction data in which the prediction value is closest to the target value DT in the prediction data set PDS (step S22). Then, the first determination unit 62 determines whether or not the acquired actual measurement value DE achieves the target value DT (step S23).

In a case in which the actual measurement value DE is more than the target value DT and does not achieve the target value DT (step S23: No), the improvement rate calculation unit 63 calculates the improvement rate R based on Mathematical Expression (2) (step S24). Then, the second determination unit 64 determines whether or not the improvement rate R is equal to or higher than the target improvement rate RT (step S25).

In a case in which the improvement rate R is equal to or higher than the target improvement rate RT (step S25: Yes), the known data set update unit 65 updates the known data set NDSa to the new known data set NDSb (step S26). The generation of the new known data set NDSb is performed by adding the actual measurement value DE and the value EV of the reaction condition corresponding to the actual measurement value DE to the known data set NDSa. Thereafter, the processing returns to step S21, and the prediction data set PDS is generated by using the updated new known data set NDSb. Thereafter, the same processing is performed.

On the other hand, in a case in which the improvement rate R is less than the target improvement rate RT (step S25: No), the prediction data set specifying unit 66 specifies the prediction data set PDS based on the past improvement rate R (step S27). In this case, the prediction data set specifying unit 66 specifies the prediction data set PDS updated by the prediction data set generation unit 60 based on the known data set NDSb generated by the known data set update unit 65 immediately after obtaining the largest improvement rate R nm the past.

Then, the actual measurement value DE is acquired by the second actual measurement value acquisition unit 67 based on the specified prediction data set PDS (step S28). In this case, the second actual measurement value acquisition unit 67 acquires the actual measurement value DE based on the prediction data including the value of the reaction condition deviating from the value EV of the reaction condition included in the prediction data used by the first actual measurement value acquisition unit 61 by a value equal to or more than a threshold value. In addition, the second actual measurement value acquisition unit 67 acquires the actual measurement value DE by selecting the prediction data in which the prediction value is closest to the target value DT in a case in which a plurality of the prediction data including the value of the reaction condition deviating from the value of the explanatory variable included in the prediction data used by the first actual measurement value acquisition unit by the value equal to or more than the threshold value are present.

In a case in which the actual measurement value DE is acquired by the second actual measurement value acquisition unit 67, the processing returns to step S23, and the determination is performed again by the first determination unit 62. Thereafter, the same processing is repeatedly executed. Moreover, in step S23, in a case in which it is determined that the actual measurement value DE acquired by the first actual measurement value acquisition unit 61 or the second actual measurement value acquisition unit 67 is equal to or less than the target value DT and the target value DT is achieved (step S23: Yes), the reaction condition for which the actual measurement value DE is acquired is set in the flow reaction device 11 via the system controller 13. The flow reaction device 11 is operated according to the set reaction conditions.

Note that steps S21, S22, S24, S26, and S28 are examples of a prediction data set generation step, a first actual measurement value acquisition step, an improvement rate calculation step, a known data set update step, and a second actual measurement value acquisition step.

As described above, in the search device 12, in a case in which the improvement rate R of the reaction result from the previous time is less than the target improvement rate RT, the second actual measurement value acquisition unit 67 acquires the actual measurement value DE of the response variable (reaction result) for the value of the explanatory variable (reaction condition) included in the prediction data, which is not used for acquiring the actual measurement value DE by the first actual measurement value acquisition unit 61, in the prediction data set PDS. Moreover, the search device 12 calculates the improvement rate R again based on the acquired actual measurement value DE. The improvement rate R is not a mere difference between the actual measurement value DE and the target value DT, but represents the speed at which the difference between the actual measurement value DE and the target value DT is reduced (that is, a search speed).

Figure 21:
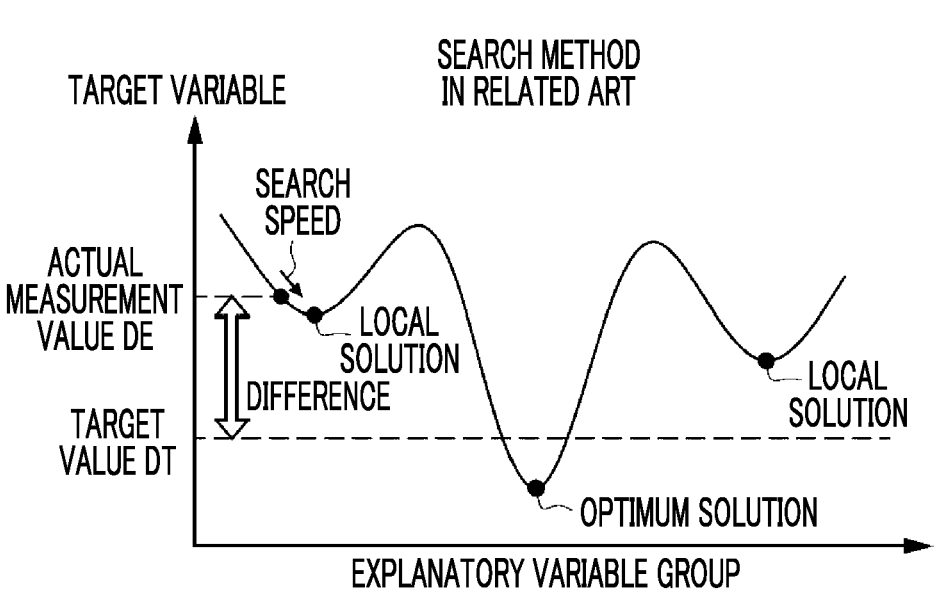
FIG. 21 is a diagram describing a problem caused by a search method in the related art.

Since the relationship between the explanatory variable and the response variable is usually non-linear, there are multipolar local solutions in addition to the optimum solution in a space of the explanatory variable. Therefore, as shown in FIG. 21, in the search method in the related art disclosed in JP2019-40984A and the like, the search region is changed based on the difference between the actual measurement value DE and the target value DT. Therefore, in a case in which the vicinity of a local solution other than the optimum solution, which achieves the target value DT, is searched for, there is possibility that the difference between the actual measurement value DE and the target value DT is only slightly reduced, the search speed is reduced, and it can take a long time to reach the optimum solution.

Figure 22:
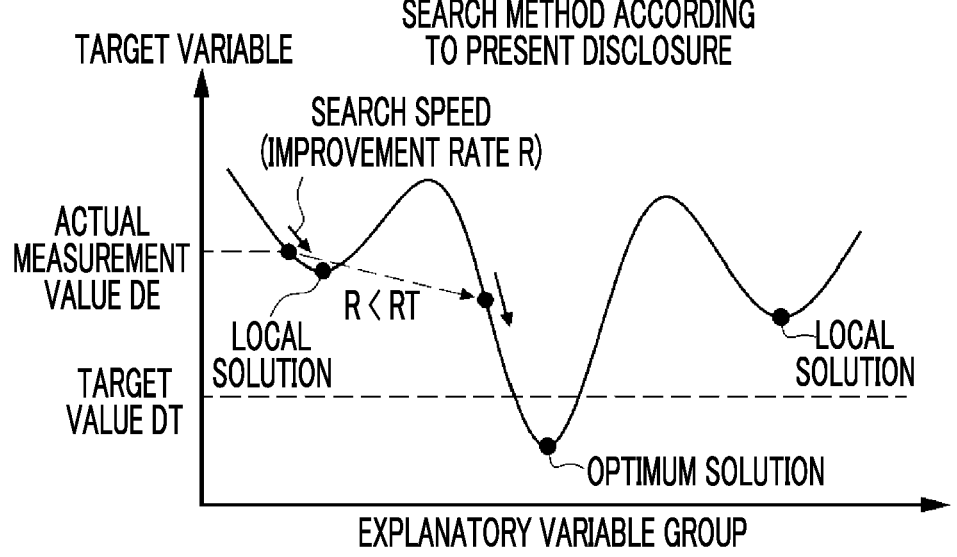
FIG. 22 is a diagram describing an effect of a search method according to the present disclosure.

On the other hand, in the search device 12 according to the present embodiment, in a case in which the improvement rate R is small as described above, the actual measurement value DE is acquired by using another prediction data, which is not used for acquiring the actual measurement value DE from the prediction data set PDS, and the improvement rate R is acquired again. As shown in FIG. 22, in a case in which the improvement rate R is less than the target improvement rate RT (in a case in which the search speed is low), the above corresponds to processing of significantly changing the search region from the vicinity of the local solution. As a result, there is a possibility that the search region is changed to the region in which the optimum solution is present, the improvement rate R is improved (the search speed may be improved), and the time required to reach the optimum solution is shortened.

In addition, in a case in which the improvement rate R is small, there is a possibility that a larger improvement rate R can be obtained, by acquiring the actual measurement value DE by using another prediction data, which is not used for acquiring the actual measurement value DE from the prediction data set PDS generated immediately after obtaining the largest improvement rate R in the past.

In addition, in a case in Which another prediction data is selected, there is a possibility that the search direction is changed to a direction of the optimum solution and a larger improvement rate R can be obtained, by acquiring the actual measurement value DE based on the prediction data including the value of the explanatory variable deviating from the value of the explanatory variable included in the prediction data used by the first actual measurement value acquisition unit 61 by a value equal to or more than the threshold value. Further, there is a possibility that the search direction is changed to a direction of the optimum solution and a larger improvement rate R can be obtained, by acquiring the actual measurement value DE by selecting the prediction data in which the prediction value is closest to the target value DT in a case in which a plurality of the prediction data including the value of the explanatory variable deviating from the value of the explanatory variable included in the prediction data by the value equal to or more than the threshold value are present.

Comparative Example

Then, as a comparative example, a case will be described in which in a case in which the improvement rate R is small, the known data set NDSb is updated based on the prediction data set PDS for which the small improvement rate R is obtained without specifying the prediction data set PDS based on the past improvement rate R as in the embodiment described above.

FIG. 23 shows the known data set NDSb updated by the known data set update unit 65 without operating the prediction data set specifying unit 66 in a case in which the improvement rate R obtained based on the known data set NDSb shown in FIG. 14 and the prediction data set PDS shown in FIG. 15 is lower than the target improvement rate RT. 24 shows the new prediction data set PDS generated by the prediction data set generation unit 60 based on the known data set NDSB shown in FIG. 23.

In this case, for example, the actual measurement value DE acquired by the first actual measurement value acquisition unit 61 is 1.06, and the improvement rate R calculated by the improvement rate calculation unit 63 is 0%. In this way, in a case in which the known data set is updated in a case in which the improvement rate R is small as in a case in which the improvement rate R is large, there is a possibility that the improvement rate R is not improved, and it takes a long time to reach the optimum solution due to the search for the vicinity of the local solution other than the optimum solution.

Modification Example

Figure 25:
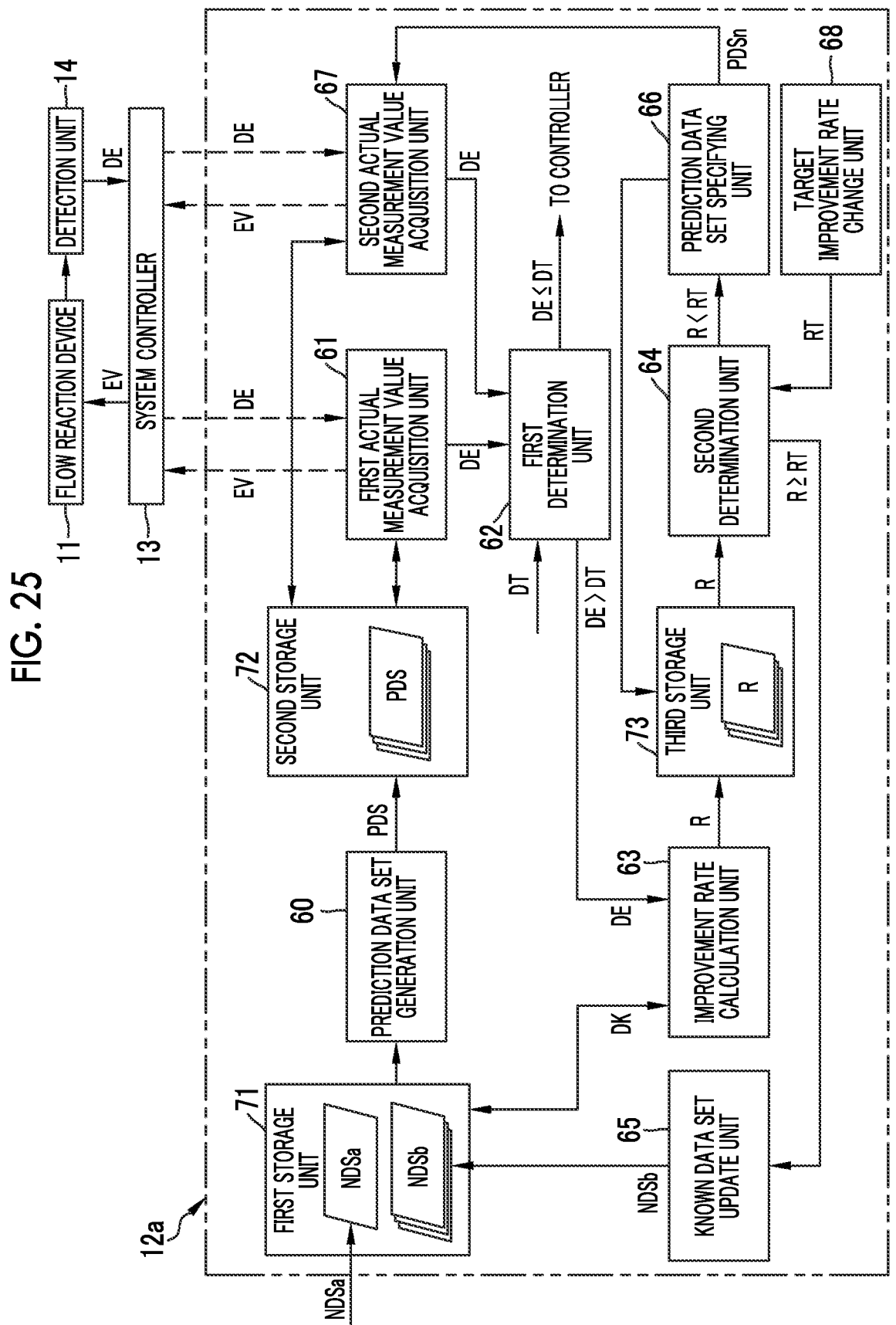
FIG. 25 is a block diagram showing the functional configuration of the search device according to a modification example.

Then, a modification example of the embodiment described above will be described. In FIG. 25, a search device 12a according to the present modification example includes a target improvement rate change unit 68, in addition to the configuration of the search device 12 according to the embodiment described above. The target improvement rate change unit 68 changes the target improvement rate RT used for determination by the second determination unit 64 in a case in which the known data set update unit 65 updates the known data set.

Specifically, since the improvement rate R is considered to be decreased as the actual measurement value DE approaches the target value DT, the target improvement rate change unit 68 changes the target improvement rate RT in a decrease direction in a case in which the known data set update unit 65 updates the known data set. By changing the target improvement rate RT in this way, it is possible to suppress inadvertently changing the search region in a case in which the actual measurement value DE approaches the target value DT and the improvement rate R is decreased.

Figure 26:
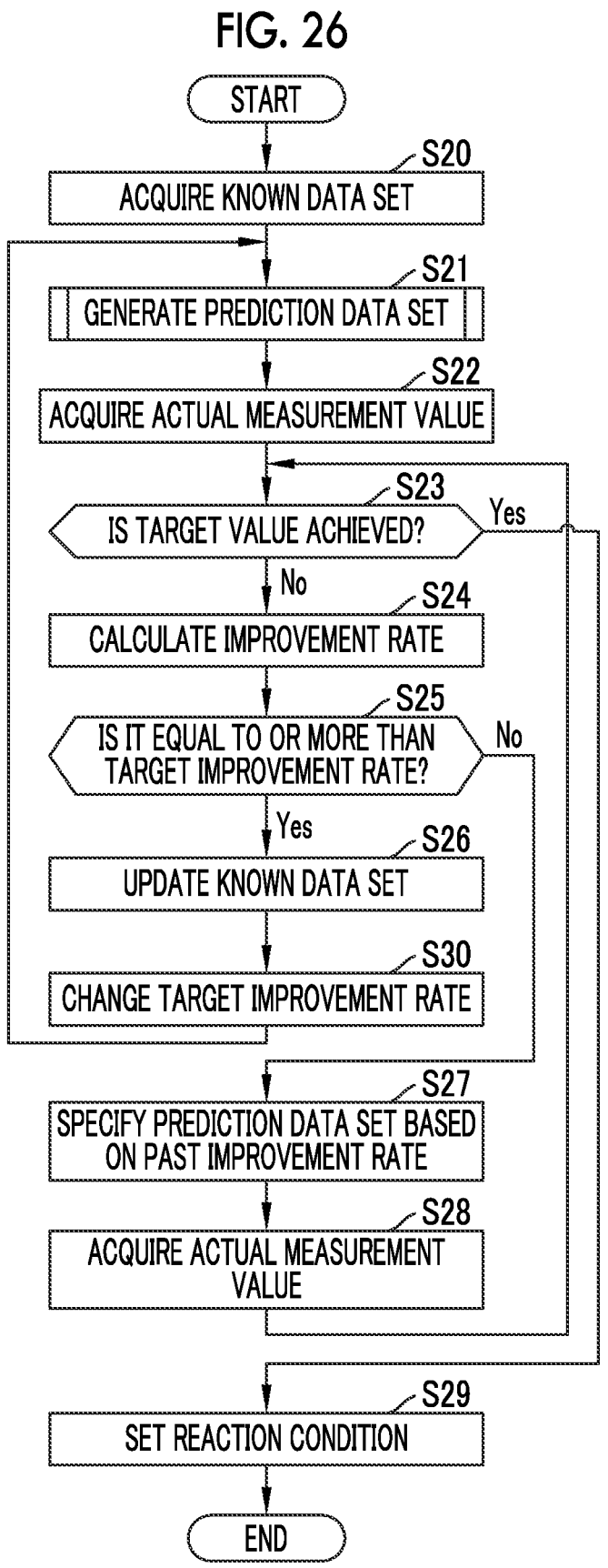
FIG. 26 is a flowchart showing a series of operations of the flow reaction equipment according to the modification example.

FIG. 26 is a flowchart showing a series of operations of the flow reaction equipment according to the present modification example. As shown in FIG. 26, in this operation, the known data set is updated (step S26), and then the target improvement rate RT is changed by the target improvement rate change unit 68 (step S30), Other operations of the flow reaction equipment according to the present modification example are the same as the operations of the flow reaction equipment 10 according to the embodiment described above. Note that the target improvement rate RT need only be changed by the target improvement rate change unit 68 after a determination is made as Yes in step S25 and before the determination is made again in step S25.

Other Modification Examples

Note that, in the embodiment described above, the dispersion is used as the value of the response variable. Since the actual measurement value DE of the dispersion approaches the target value DT as the value becomes smaller, the improvement rate R is defined as a positive value by defining the improvement rate R by Mathematical Expression (2). On the other hand, in a case in which the response variable is the parameter that approaches the target value as the value becomes larger, such as the yield in flow synthesis, the improvement rate R need only be defined by Mathematical Expression (2a).

$$R = (DE - DK) \times 100/DK \qquad (2a)$$

In addition, in a case in which the parameter, such as the molecular weight, which preferably converges to a specific value is used as the response variable, the improvement rate R need only be defined by Mathematical Expression (2b).

$$R = |DK - DE| \times 100/DK \qquad (2b)$$

In addition, in the embodiment described above and the modification example, one response variable is used, but the response variable may be two or more.

In addition, in the embodiment described above and the modification example, the search device is applied to the flow reaction equipment, but the technology of the present disclosure is not limited to the flow reaction equipment. The present disclosure can be applied to any equipment as long as the equipment includes a device that obtains a known data set composed of a plurality of known data in which one or more explanatory variables and one or more response variables are associated with each other.

In the embodiment described above and the modification example, examples of the hardware structure of the processing unit that executes various processing, such as the prediction data set generation unit 60, the first actual measurement value acquisition unit 61, the first determination unit 62, the improvement rate calculation unit 63, the second determination unit 64, the known data se update unit 65, the prediction data se specifying unit 66, the second actual measurement value acquisition unit 67, and the target improvement rate change unit 68, include various processors described below. The various processors include, in addition to the CPU 52, which is a general processor that executes software (operation program) and functions as various processing units as described above, a programmable logic device (PLD), which is a processor of which a circuit configuration can be changed after the manufacture, such as a field programmable gate array (FPGA), a dedicated electric circuit, which is a processor having a circuit configuration designed specially for executing a specific process, such as an application specific integrated circuit (ASIC), and the like.

One processing unit may be configured by one of the various processors, or may be a combination of two or more processors of the same type or different types (for example, a combination of a plurality of FPGAs or a combination of a CPU and/or an FPGA). In addition, a plurality of the processing units may be configured by one processor.

As an example of configuring the plurality of processing units by one processor, first, as represented by a computer, such as a client and a server, there is a form in which one processor is configured by a combination of one or more CPUs and software and this processor functions as the plurality of processing units. Second, as represented by a system on chip (SoC) and the like, there is a form in which a processor is used that realizes the functions of the entire system including a plurality of processing units with a single integrated circuit (IC) chip. As described above, as the hardware structure, various processing units are configured by one or more of various processors described above.

Further, as the hardware structures of these various processors, more specifically, it is possible to use an electrical circuit (circuitry) in which circuit elements such as semiconductor elements are combined.

From the above description, the invention described in the following supplementary note 1, 2, and 3 can be grasped.

Supplementary Note 1

A search device comprising a prediction data set generation processor that generates a prediction data set composed of a plurality of prediction data in which an explanatory variable for which a value of a response variable is unknown and a prediction value of the response variable are associated with each other by using a known data set composed of a plurality of known data in which one or more explanatory variables and one or more response variables are associated with each other, a first actual measurement value acquisition processor that acquires an actual measurement value of the response variable for a value of the explanatory variable included in the prediction data in which the prediction value is closest to a target value in the prediction data set, an improvement rate calculation processor that specifies a known value of the response variable closest to the target value as a reference value from the known data set, and calculates an improvement rate representing a difference between the reference value and the actual measurement value, a known data set update processor that adds the actual measurement value and a value of the explanatory variable corresponding to the actual measurement value to the known data set as the known data in a case in which the improvement rate is equal to or higher than a target improvement rate, and a second actual measurement value acquisition processor that acquires an actual measurement value of the response variable for a value of the explanatory variable included in the prediction data, which is not used for acquiring the actual measurement value by the first actual measurement value acquisition processor, in the prediction data set, the actual measurement value being used for recalculating the improvement rate, in a case in which the improvement rate is lower than the target improvement rate.

Supplementary Note 2

The search device according to Supplementary Note 1, further comprising a prediction data set specifying processor that specifies the prediction data set generated by the prediction data set generation processor based on the known data set updated by the known data set update processor immediately after obtaining a highest improvement rate in the past, in a case in which the improvement rate is lower than the target improvement rate, in which the second actual measurement value acquisition processor acquires the actual measurement value of the response variable for the value of the explanatory variable included in the prediction data, which is not used for acquiring the actual measurement value by the first actual measurement value acquisition processor, in the prediction data set specified by the prediction data set specifying processor, the improvement rate calculation processor calculates the improvement rate based on the known data set updated by the known data set update processor, and the actual measurement value acquired by the second actual measurement value acquisition processor, and the known data set update processor adds, as the known data, the actual measurement value acquired by the second actual measurement value acquisition processor, and the value of the explanatory variable corresponding to the actual measurement value to the known data set in a case in which the improvement rate is equal to or higher than the target improvement rate.

Supplementary Note 3

The search device according to Supplementary Note 1 or 2, further comprising a target improvement rate change processor that changes the target improvement rate in a case in which the known data set update processor updates the known data set.

In the technology of the present disclosure, it is possible to appropriately combine various embodiments and various modification examples described above. In addition, it is needless to say that the present disclosure is not limited to each of the embodiments described above, various configurations can be adopted as long as the configuration does not deviate from the gist. Further, the technology of the present disclosure includes a storage medium that non-temporarily stores the program, in addition to the program.

The description contents and the shown contents above are the detailed description of the parts according to the technology of the present disclosure, and are merely examples of the technology of the present disclosure. For example, the above descriptions of the configuration, the function, the action, and the effect are the descriptions of examples of the configuration, the function, the action, and the effect of the parts according to the technology of the present disclosure. Therefore, it is needless to say that unnecessary parts may be deleted, new elements may be added, or replacements may be made with respect to the description contents and the shown contents above within a range that does not deviate from the gist of the technology of the present disclosure. In addition, in order to avoid complications and facilitate understanding of the parts according to the technology of the present disclosure, in the description contents and the shown contents above, the description of common technical knowledge and the like that do not particularly require description for enabling the implementation of the technology of the present disclosure are omitted.

In the present specification, "A and/or B" is synonymous with "at least one of A or B". That is, "A and/or B" means that it may be only A, only B, or a combination of A and B.

All of the documents, the patent applications, and the technical standards described in the present specification are incorporated in the present specification as a reference to the same extent as a case in which individual document, patent application, and technical standard are specifically and individually noted to be incorporated as reference.

EXPLANATION OF REFERENCES

10: flow reaction equipment
11: flow reaction device
12, 12a: search device
13: system controller
14: detection unit
15: setting unit
21: first raw material supply unit
22: second raw material supply unit
23, 23a: reaction section
24: temperature adjustment unit
25: recovery section
31, 41: merging portion
31a, 41a: first pipe portion
31b, 41b: second pipe portion
31c, 41c: third pipe portion
32: reaction portion
33a, 43a: first flow speed sensor
33b, 43b: second flow speed sensor
33c, 43c: third flow speed sensor
34: temperature sensor
41d: fourth pipe portion
42: reaction portion
43d: fourth flow speed sensor
50: storage device
51: memory 53: communication unit
54: display
55: input device
56: busline
60: prediction data set generation unit
60a: learning unit
60b: trained model storage unit
60c: search unit
61: first actual measurement value acquisition unit
62: first determination unit
63: improvement rate calculation unit
64: second determination unit
65: known data set update unit
66: prediction data set specifying unit
67: second actual measurement value acquisition unit
68: target improvement rate change unit
71: first storage unit
72: second storage unit
73: third storage unit
Φ: reaction path diameter
δ: deviation rate
EV: value of reaction condition
DE: actual measurement value
DK: reference value
DS: prediction value
DT: target value
L1: input layer
L2: interlayer
L3: output layer
L: reaction path length
M: learning model
NDSa, NDSb: known data set
PDS: prediction data set
R: improvement rate
RT: target improvement rate
What is claimed is:

1. Flow reaction equipment comprising:
   a search device;
   a reaction section inside which is a flow path, configured so that through the flow path a mixture of a first raw material and a second raw material flows, and a flow reaction is performed;
   a recovery section that is connected to the reaction section and is configured to recover a product from the reaction section;
   a system controller that is configured to control the reaction section under a reaction condition as a condition parameter that is set, the condition parameter including items of concentration and flow speed of the first raw material, concentration and flow speed of the second raw material, shape of a merging portion, reaction path diameter, reaction path length, and reaction temperature; and
   a detection unit that is configured to detect a reaction result as a result parameter in the reaction section, and is configured to output the detected reaction result to the search device via the system controller, the result parameter including yield, property of a product, molecular weight dispersion, purity of the product, molecular weight, concentration of the product in a solution, or yield or purity of a by-product,
   wherein
   the search device comprises:
   a prediction data set generation unit comprising a learning unit, a trained model storage unit, and a search unit and configured to generate a trained model by performing machine learning using a known data set as supervised data based on a learning model by the learning unit, wherein the trained model is a function representing a relationship between the condition parameter as an explanatory variable and the result parameter as a response variable, wherein the trained model storage unit is configured to store the learning model generated by the learning unit, and wherein the search unit, by executing a search algorithm, is configured to: generate, based on the known data set, a prediction data set composed of a plurality of prediction data in which for each explanatory variable a value of the response variable is unknown, and associate each explanatory variable in the prediction data with a respective prediction value of the response variable based on the trained model stored in the trained model storage unit;

a first actual measurement value acquisition unit configured to acquire a first actual measurement value, DE, of the response variable for a value of the explanatory variable by registering the value of the explanatory variable included in the prediction data closest to a target value, DT, into the system controller, and operating the flow reaction device with said value of the explanatory variable;

an improvement rate calculation unit configured to calculate an improvement rate using a mathematical expression R=(DK−DE)×100/DK, R=(DE−DK)×100/DK or R=|DK−DE|×100/DK, wherein R represents the improvement rate, DK represents a reference value which is a known value of the response variable within the known data set and is closest to the target value, DT, and DE represents the first actual measurement value, and wherein the mathematical expression R=(DK−DE)×100/DK is used when the actual measurement value DE approaches the target value DT as the value DE becomes smaller, the mathematical expression R=(DE−DK)×100/DK is used when the response variable is a parameter that approaches the target value DT as the value becomes larger, such as the yield in flow synthesis, and the mathematical expression R=|DK−DE|×100/DK is used when a parameter, such as the molecular weight, which preferably converges to a specific value is used as the response variable;

a known data set update unit configured to add the first actual measurement value and a value of the explanatory variable corresponding to the first actual measurement value to the known data set as known data in a case in which the improvement rate is equal to or higher than a target improvement rate; and a second actual measurement value acquisition unit configured to acquire, in a case where the improvement rate is lower than the target improvement rate, a second actual measurement value, DE, of the response variable for a value of the explanatory variable included in the prediction data, wherein said value of the explanatory variable is not used for acquiring the first actual measurement value by the first actual measurement value acquisition unit and deviates from the value of explanatory variable used for acquiring the first actual measurement value, DE, by a value equal to or more than a threshold value, and wherein the second actual measurement value is used for recalculating the improvement rate, wherein the system controller is configured to operate the search device using the reaction condition as the explanatory variable and the reaction result as the response variable, and is configured to set the value of the explanatory variable corresponding to the first actual measurement value or the second actual measurement value in the reaction section as the reaction condition in a case in which said actual measurement value achieves the target value, and wherein the flow reaction equipment obtains a product by reaction processing.

2. The flow reaction equipment according to claim 1, further comprising:

a prediction data set specifying unit configured to specify the prediction data set generated by the prediction data set generation unit with reference to data of a past improvement rate accumulated in a storage unit, and based on the known data set updated by the known data set update unit immediately after obtaining a highest improvement rate in the past, in a case in which the improvement rate is lower than the target improvement rate, wherein the second actual measurement value acquisition unit is configured to acquire the second actual measurement value of the response variable for the value of the explanatory variable included in the prediction data, which is not used for acquiring the first actual measurement value by the first actual measurement value acquisition unit, in the prediction data set specified by the prediction data set specifying unit, the improvement rate calculation unit is configured to calculate the improvement rate based on the known data set updated by the known data set update unit, and the second actual measurement value acquired by the second actual measurement value acquisition unit, and the known data set update unit is configured to add, as the known data, the second actual measurement value acquired by the second actual measurement value acquisition unit, and the value of the explanatory variable corresponding to the second actual measurement value to the known data set in a case in which the improvement rate is equal to or higher than the target improvement rate.

3. The flow reaction equipment according to claim 2, wherein the second actual measurement value acquisition unit is configured to acquire the second actual measurement value based on the prediction data including a value of the explanatory variable deviating from the value of the explanatory variable included in the prediction data used by the first actual measurement value acquisition unit by a value equal to or more than a threshold value, in the prediction data set specified by the prediction data set specifying unit.

4. The flow reaction equipment according to claim 3, wherein the second actual measurement value acquisition unit is configured to acquire the second actual measurement value by selecting the prediction data in which the prediction value is closest to the target value in a case in which a plurality of the prediction data including the value of the explanatory variable deviating from the value of the explanatory variable included in the prediction data used by the first actual measurement value acquisition unit by the value equal to or more than the threshold value are present.

5. The flow reaction equipment according to claim 1, further comprising:

a target improvement rate change unit that is configured to change the target improvement rate in a case in which the known data set update unit updates the known data set.

6. The flow reaction equipment according to claim 2, wherein the search algorithm is a genetic algorithm.

7. An operation method of flow reaction equipment, the method comprising:

a prediction data set generation step, by executing a search algorithm, of: generating, based on a known data set, a prediction data set composed of a plurality of prediction data in which for each explanatory variable a value of a response variable is unknown and associating each explanatory variable in the prediction data with a respective prediction value of the response variable based on a trained model stored in a trained model storage unit;

a first actual measurement value acquisition step of acquiring a first actual measurement value, DE, of the response variable for a value of the explanatory variable by registering the value of the explanatory variable included in the prediction data closest to a target value, DT, into a system controller, and operating a flow reaction device with said value of the explanatory variable;

an improvement rate calculation step of calculating an improvement rate using a mathematical expression R=(DK−DE)×100/DK, R=(DE−DK)×100/DK or R=|DK−DE|×100/DK, wherein R represents the improvement rate, DK represents a reference value which is a known value of the response variable within the known data set and is closest to the target value, DT, and DE represents the first actual measurement value, and wherein the mathematical expression R=(DK−DE)×100/DK is used when the actual measurement value DE approaches the target value DT as the value DE becomes smaller, the mathematical expression R=(DE−DK)×100/DK is used when the response variable is a parameter that approaches the target value DT as the value becomes larger, such as yield in flow synthesis, and the mathematical expression R=|DK−DE|×100/DK is used when a parameter, such as molecular weight, which preferably converges to a specific value is used as the response variable;

a known data set update step of adding the first actual measurement value and a value of the explanatory variable corresponding to the first actual measurement value to the known data set as the known data in a case in which the improvement rate is equal to or higher than a target improvement rate; and a second actual measurement value acquisition step of acquiring, in a case where the improvement rate is lower than the target improvement rate, a second actual measurement value, DE, of the response variable for a value of the explanatory variable included in the prediction data, wherein said value of the explanatory variable is not used for acquiring the first actual measurement value in the first actual measurement value acquisition step and deviates from the value of explanatory variable used for acquiring the first actual measurement value, DE, by a value equal to or more than a threshold value, and wherein the second actual measurement value is used for recalculating the improvement rate, and operating the search device using a reaction condition as the explanatory variable and a reaction result as the response variable, and sets the value of the explanatory variable corresponding to the first actual measurement value or the second actual measurement value in a reaction section as the reaction condition in a case in which said actual measurement value achieves the target value.

8. A non-transitory computer readable recording medium storing instructions to cause a computer to perform the steps of the method according to claim 7.

9. An operation method of the flow reaction equipment according to claim 1.

* * * * *